(12) United States Patent
King et al.

(10) Patent No.: US 9,334,186 B2
(45) Date of Patent: May 10, 2016

(54) TWO-STAGE GRAVITY PRESS

(71) Applicants: David V. King, Gibsonia, PA (US);
David T. Perry, Poseyville, IN (US)

(72) Inventors: David V. King, Gibsonia, PA (US);
David T. Perry, Poseyville, IN (US)

(73) Assignee: Pittsburgh Glass Works, LLC, Pittsburgh, PA (US)

( * ) Notice: Subject to any disclaimer, the term of this patent is extended or adjusted under 35 U.S.C. 154(b) by 0 days.

(21) Appl. No.: 14/700,649

(22) Filed: Apr. 30, 2015

(65) Prior Publication Data

US 2015/0232368 A1  Aug. 20, 2015

Related U.S. Application Data

(63) Continuation-in-part of application No. 14/455,294, filed on Aug. 8, 2014, which is a continuation-in-part of application No. 13/117,245, filed on May 27, 2011, now abandoned.

(51) Int. Cl.
*C03B 23/03* (2006.01)
(52) U.S. Cl.
CPC .................................. *C03B 23/0302* (2013.01)
(58) Field of Classification Search
CPC .......................... C03B 23/0302; C03B 23/0305
See application file for complete search history.

(56) References Cited

U.S. PATENT DOCUMENTS

| | | | |
|---|---|---|---|
| 3,582,304 | A | 6/1971 | Bognar |
| 4,265,652 | A | 5/1981 | Goto et al. |
| 5,122,177 | A | 6/1992 | Yoshizawa et al. |
| 5,599,367 | A | 2/1997 | Funk et al. |
| 7,240,519 | B2 | 7/2007 | Schwartz et al. |

FOREIGN PATENT DOCUMENTS

| | | |
|---|---|---|
| EP | 0431895 | 6/1991 |
| EP | 1826186 | 8/2007 |
| JP | 2005170766 | 6/2005 |

*Primary Examiner* — Erin Snelting
(74) *Attorney, Agent, or Firm* — Cohen & Grigsby, P.C.

(57) ABSTRACT

Apparatus for shaping at least one glass sheet wherein a lower press ring and an upper press ring are configured to clamp a perimeter section of the glass sheet between the lower press ring and the upper press ring. The apparatus also includes an inner press at least partially disposed within the upper press ring and configured to shape at least a section of the glass sheet inside the perimeter section of the glass sheet. The inner press is fixed to a top plate and is moveable within limits with respect to the upper press ring. When a suspension assembly and the top plate are lowered, a carrying frame limits the descending movement of the upper press ring so that the inner press descends under gravity force until the upper press ring contacts the carrying frame and the suspension assembly decouples from the top plate. The inner press continues to move downwardly under gravity force to shape the center part of the ply until the top plate contacts the upper press ring. To unclamp the ply, the suspension assembly is vertically raised to cause the suspension assembly to re-couple with the top plate and move the inner press upwardly until the suspension assembly lifts the upper press ring together with the inner press.

34 Claims, 24 Drawing Sheets

TWO-STAGE GRAVITY PRESS

BACKGROUND OF THE INVENTION

1. Field of the Invention

The presently disclosed invention relates to apparatus and methods for shaping transparencies and, more particularly, apparatus and methods for shaping one or more transparency plies in a heating process.

2. Discussion of the Prior Art

Vehicle transparencies such as windshields and windscreens, are usually laminated structures that include two layers (i.e. "plies") of glass that are bound together by a thermoplastic material, such as vinyl. Flat sheets of glass (e.g., float glass) that are larger than the desired size of the laminated structure are cut to size to create inner and outer glass plies. The edges of the glass plies are ground, the plies are washed, and a ceramic paint is often applied to a portion or portions of one or both of the plies. The plies are heated and shaped, either one ply at a time (i.e., a singlet process) or at the same time with both plies stacked (i.e., a doublet process). The shaping process is accomplished by pressing the plies into the final form using a press tool. Generally, a lower press ring lifts the plies and presses them on to a top press to achieve the desired shape and dimensional characteristics. A thermoplastic material layer or layers are inserted between the plies and the laminated structure is heated in an autoclave such that the desired clarity and visual characteristics of the laminated structure are achieved.

Vehicle manufacturers often design vehicle glass panels that utilize glass having curves of smaller radii to improve wiperability, reduce weight, improve the vehicle's aerodynamic properties, lower the vehicle's profile, etc. In forming such curves, the forming process must be designed such that the glass is not overstressed to the point that the glass breaks or buckles, thus creating optical and reflective distortion (i.e., a lens effect). However, current manufacturing techniques often result in such deleterious effects. When a lower ring pushes the glass from the outside perimeter over the press shape, stresses are created in the glass that cause localized buckling around the perimeter of the glass.

In the prior art, glass manufacturers attempted to minimize the effect of such bucking by including an additional step in the manufacturing process. Generally, the glass was pressed into shape according to the conventional process of forming the center of the glass first and then forming the perimeter areas of the glass. This process resulted in wrinkles and buckles in the glass and caused optical distortions. Counter forces were then applied to the formed glass to alleviate the wrinkles, buckles and other distortions resulting from this process. However, such buckling is a function of several variables including glass thickness, depth of the required bend in the glass, and the time that the glass is allowed to bend during the forming process. Such complexities made the use of counter forces to alleviate folds, wrinkles, buckles and the like difficult and produced somewhat unpredictable results. Accordingly, such prior art systems and methods have resulted in slower manufacturing processes and higher breakage rates making the overall process more costly. Moreover, such processes still failed to produce transparencies of acceptable quality for some applications.

For example, newer model vehicles offer optional features that demand a higher degree of fidelity to the precise surface contours and dimensions of the windshield design. For example, some vehicles offer a feature for automatic activation of the breaking system in response to road obstructions. In another example, some current model vehicles offer a feature by which the firmness of the vehicle suspension system is regulated to anticipate and counteract irregularities in the road surface. Such systems are controlled by comparison of road images that are taken simultaneously from different, forward looking vantage points from inside the vehicle. The image comparison is provided to the breaking control system or the suspension control system. The brakes and the suspension are adjusted according to the size and location of the sensed obstruction or irregularity. The forward looking images are captured by cameras that view the roadway through the windshield. Both systems require the cameras to provide images of relatively high resolution within a relatively short response time. For vehicles with such breaking and suspension features, distortions in the windshield of a degree that previously may have been acceptable are unacceptable for those portions of the windshield that are in the field of view of the camera. Such distortions may cause the braking system or the suspension control system to misinterpret road conditions and cause the system to fail to react or to react improperly. Accordingly, there was a need in the prior art for systems and methods for improving the surface quality and dimensional control of windshields—especially those windshields on vehicles equipped with high-performance braking and suspension options such as those described herein. Thus, there was a need for glass panel manufacturing processes and equipment that allows for glass panels to be formed while minimizing the negative effects of bending the glass and for improving the surface quality and dimensional control of transparencies.

SUMMARY OF THE INVENTION

Various embodiments of the present invention are directed to an apparatus for shaping at least one glass sheet. The apparatus includes a lower press ring and an upper press ring configured to clamp a perimeter section of the glass sheet between the lower press ring and the upper press ring. The apparatus also includes an upper press at least partially disposed within the upper press ring, the upper press configured to shape at least a section of the glass sheet inside the perimeter section of the glass sheet.

Various embodiments of the present invention are directed to a system for shaping at least one glass sheet. The system includes a lower press ring and an upper press assembly. The upper press assembly includes an upper press ring configured to clamp a perimeter section of the glass sheet between the lower press ring and the upper press ring, and an upper press at least partially disposed within the upper press ring, the upper press configured to shape at least a section of the glass sheet inside the perimeter section of the glass sheet. The system further includes a press positioning assembly that is configured to raise and lower the upper press within the upper press ring.

Various embodiments of the present invention are directed to an apparatus for shaping at least one glass sheet. The apparatus includes means for clamping a perimeter section of the glass sheet, and means for shaping at least a section of the glass sheet inside the perimeter section of the glass sheet.

Various embodiments of the present invention are directed to a method for shaping at least one glass sheet. The method includes clamping a perimeter section of the glass sheet between a lower press ring and an upper press ring, and shaping at least a section of the glass sheet inside the perimeter section of the glass sheet using a movable upper press that is disposed within the upper press ring.

In accordance with the invention disclosed herein, a multistage press is used to shape transparency plies by clamping the band of the transparency near the perimeter of the transparency and pressing the center of the area of the transparency inside the band to the final desired shape while the perimeter band of the transparency remains clamped. The system includes an upper press assembly that includes an upper ring and an inner press. The upper ring defines a forming surface that is located between the perimeter edge of the upper ring and a center opening through the upper ring. A lower press ring has a clamping surface that is oriented to face the forming surface of the upper ring. The lower press ring and the upper ring are moveable with respect to each other so that they can be brought together to clamp the perimeter band of the transparency between the forming surface of the upper ring and the clamping surface of the lower ring. An inner press that is located in the center opening of the upper ring has a face surface with a profile that corresponds to the final shape of the center portion of the transparency. The inner press is moveable within the center opening of the upper ring between a first position where the face surface does not contact the transparency after the transparency is clamped between the upper ring and the lower press ring and a second position where the perimeter of the face surface of the inner press is substantially even with the edge of the center opening of the upper ring. When the inner press is in the second position, the face surface of the inner press forms and defines the surface of the transparency. Mechanical apparatus controls the movement of said inner press between said first and second positions with respect to said upper ring. However, while the transparency is still being shaped, a vacuum is applied from a vacuum source through openings in the face surface of the inner press to locations between the upper press assembly and the transparency. The vacuum is strong enough to form at least a portion of the transparency. After the transparency is formed, the upper ring and the lower press ring are moved apart to relieve the clamping of the transparency. After the upper ring and the lower press ring are moved apart, the vacuum apparatus maintains the transparency on the upper press assembly. As the vacuum apparatus continues to maintain the transparency on the upper press assembly, a cold ring is laterally advanced below the transparency. When the cold ring is laterally positioned to receive the transparency, the vacuum is discontinued and the transparency falls away from the upper press assembly and is received by the cold ring. Thereafter, the transparency can be maintained on the cold ring until the transparency has sufficiently hardened to be handled by other equipment.

Preferably, the upper ring includes two or more pivotal joints between different portions of the upper ring. The pivotal joints allow adjacent portions of the upper ring to pivot with respect to each other. However, the pivotal joints block the shear movement between adjacent portions of the upper ring. In this way, the upper ring allows for torsional movement or flexing so that the forming surface of the upper ring laterally aligns with the peripheral edge of the face surface of the inner press at times when the inner press is in the forming position while avoiding discontinuities or offsets between the forming surface of adjacent portions of the upper ring.

Also preferably, the flow path between the vacuum source and the openings in the face surface of the inner press includes a chamber wherein the vacuum is regulated such that the vacuum at the openings in the face surface of the inner press is greater than the vacuum needed to maintain the ply on the upper press assembly. The vacuum is sufficiently strong to contribute to the formation of the ply surface in the area of the openings. The greater vacuum results in greater fidelity of the surface of the ply to the face surface of the inner press in the area or areas of the openings as compared to the surface of the ply to portions of the face surface of the inner press that are outside the area of the openings.

More preferably, the flow path between the vacuum source and the openings in the face surface of the inner press include an array of passageways between the regulated vacuum chamber and respective openings in the face surface of the inner press. The pattern of the array of passageways and the respective openings define an envelope within which the greater fidelity of the surface of the ply occurs. The envelope can have any predetermined shape depending on the pattern and location of the openings.

In some embodiments, improved vacuum response is achieved by applying the vacuum that holds the formed ply to the upper press assembly from a passageway through the upper press ring to the gap between the upper press ring and the inner press. At times when the inner press is in the forming position, a seal blocks air flow from the between the upper surfaces of the upper press ring and the inner press to the passageway through the upper press ring. This results in an air pressure differential between the side of the ply that is in contact with the upper press assembly and the opposite side of the ply so as to maintain the ply against the upper press assembly. At times when the inner press is moved away from the forming position toward the retracted position, the seal in the gap between the inner press and the upper press ring is broken and air is allowed to flow through the gap from between the upper surface of the inner press and the upper surface of the upper press ring. Such air flow equalizes the air pressure on opposite sides of the ply such that the ply falls away from the face of the upper press assembly. Controlling the application of vacuum to one side of the ply through application of a seal that is physically close to the ply affords a fast application and release of vacuum to the ply. In this way, response in securing the ply to and releasing the ply from the upper press assembly is faster than presses known in the prior art.

Also, in some embodiments, the upper press ring includes a plurality of heating elements, each of such heating elements having a major longitudinal axis that is oriented in a position that is generally parallel to the direction of movement of the inner press between the retracted and forming positions. In this way, the heating elements have respective longitudinal ends that are equidistant from the forming surface of the upper press ring. Furthermore, the heating elements are evenly distributed with respect to the forming surface of the upper press ring. This orientation and location of the heating elements afford a more even heating of the forming surface of the upper press ring in comparison to presses known in the prior art.

Various embodiments of the presently disclosed invention are directed to apparatus for shaping at least one transparency. The apparatus includes a lower press ring and a two-stage gravity press that is configured to clamp a perimeter band of the transparency between the lower press ring and the two stage gravity press. The two stage gravity press includes an inner press that has a forming surface that is at least partially disposed within an upper press ring. The inner press is configured to move from a first position relative to the upper press ring toward a second position relative to the upper press ring under the force of gravity. Movement of the inner press from the first position to the second position shapes at least a section of the transparency that is located inside the perimeter band of the transparency according to the forming surface of the inner press.

The two-stage gravity press includes an upper press ring that is configured to clamp a perimeter section of the transparency between the lower press ring and the upper press ring.

The two-stage gravity press also includes an inner press that is at least partially disposed within the upper press ring. The inner press is configured to shape at least a section of the transparency inside the perimeter band of the transparency as the inner press moves from the first position to the second position in response to gravitational forces on the inner press. The two-stage gravity press further includes a suspension assembly that raises the inner press within the upper press ring in the direction from the second position toward the first position.

In accordance with the presently disclosed invention, a multistage press that includes an inner press within an upper press ring is used to shape transparency plies by clamping a band of the transparency near the perimeter of the transparency. While the perimeter band of the transparency remains clamped, the inner press of the multistage press presses the area of the transparency inside the band as the inner press moves from a first position to a second position under the force of gravity on the inner press. The apparatus includes a two-stage gravity press having a first stage gravity press ring that includes an upper press ring. The two-stage gravity press also has a second stage gravity press that includes an inner press. The upper press ring defines a downwardly facing clamping surface that is located between the lateral perimeter side of the upper press ring and an inner side of the upper press ring. A lower press ring that can be supported on a frame defines an upwardly facing clamping surface that is oriented to oppose the downwardly facing clamping surface of the upper press ring. The lower press ring and the two-stage gravity press are vertically moveable with respect to each other so that they can be brought together to clamp the perimeter band of the transparency between the clamping surface of the upper press ring and the clamping surface of the lower press ring.

The inner press is located in a center opening of the upper press ring. The inner press defines a forming surface that corresponds to the design contour for the center portion of the transparency. The inner press is vertically moveable within the center opening of the upper press ring between a first position and a second position. In the first position, lower stops on the upper press ring contact the frame that supports the lower press ring while and the upper stops of the upper press ring contact the second stage gravity press. In the second position, the lower stops on the upper press ring still contact the frame but the second stage gravity press contacts the body of the upper press ring. In the first position, the transparency is clamped between the upper press ring and the lower press ring, but the inner press does not contact the transparency. In the second position, the transparency remains clamped between the upper press ring and the lower press ring while gravity has caused the inner press to move against the transparency so that the forming surface of the inner press forms and defines corresponding contours in the surface of the transparency.

A suspension assembly that is coupled to the second stage gravity press suspends the two-stage gravity press at times when the lower stops of the first stage gravity press are vertically apart from the frame. At times when the lower stops of the first stage gravity press contact the frame, the suspension assembly can be coupled to the second stage gravity press to move the second stage gravity press from the second position to the first position. However, at times when the lower stops of the first stage gravity press contact the frame and the second stage gravity press is moving in a direction from the first position to the second position, the suspension assembly decouples from the second stage gravity press and the second stage gravity press travels toward the second position to form the transparency in response to the force of gravity.

After the transparency is formed, the end of the suspension assembly is moved vertically upward to move the upper press ring from the second position to the first position. Thereafter, the end of the suspension assembly is moved further vertically upward so that the lower stops on the upper press ring separate from the frame and the upper press ring is moved away from the lower press ring to relieve the clamping of the transparency.

In an embodiment, a fluid network connects a fluid input port to a plurality of openings in the forming face of said inner press. After the upper press ring is moved upwardly from the lower press ring, pressure may be applied to the fluid network to urge the plies away from the forming surface. Thereafter, the transparency is supported on the lower press ring and the frame is moved laterally away from the position of the forming station.

In an embodiment, the apparatus includes a locator guide that controls the lateral position of said second stage gravity press with respect to the position of said frame. The locator guide includes a first part on the frame and a second part on the second stage gravity press. The first part and the second part can form one component of the locator guide that controls the position of said second stage gravity press along one axis. Additional first and second parts can form other components of the locator guide to control the position along axes that are transverse with respect to the one axis. The first component can include a first part that is one of a guide locator and a guide receiver and the second part can include the other of the guide locator and the guide receiver. An additional component can include a first part that is one of a resting locator and a resting receiver and a second part that is the other of said resting locator and a resting receiver.

Also in an embodiment, the second stage gravity press can include a top plate that is rigidly secured to the inner press. The top plate has a plurality of holes therein and the upper press ring can include one or more extensions that protrude from the body of the upper press ring through respective holes in the top plate. Upper stops are secured to respective extensions of the upper press ring with the top plate located between the upper stops and the body of the top plate.

In an embodiment, the suspension assembly can include a bridge that is secured to the second stage gravity press and that defines a space between the bridge and the second stage gravity press. An arm or cross-piece extends through the space between the bridge and the second stage gravity press and is connected to an end of a flexible tension member. At times when the flexible tension member maintains the arm against the bottom of the bridge, the suspension assembly is coupled to the second stage gravity press so that movement of the end of the flexible tension member causes corresponding movement of the second stage gravity press. At times when the arm is not maintained against the bottom of the bridge, the suspension assembly is decoupled from the second state gravity press so that movement of the second stage gravity press is independent of movement of the suspension assembly.

Other details, objects, and advantages of the present invention will become better understood or apparent from the following description and drawings showing embodiments thereof.

BRIEF DESCRIPTION OF THE DRAWINGS

Various embodiments of the present invention are described herein by way of example in conjunction with the following figures, wherein.

PRESENTLY PREFERRED EMBODIMENT OF THE INVENTION

Embodiments of the present invention are directed to a multi-stage glass panel manufacturing process in which the perimeter of at least one glass sheet that comprises the glass panel is clamped to a final dimensional profile. The center of the glass sheet is then pressed out to achieve the desired dimension and shape of the glass. Such a process minimizes compressive stress, reduces thin film buckling, and reduces optical distortion. In various embodiments, the present invention may be used to shape single glass sheets (i.e., singlets), double glass sheets (i.e., doublets), or any other multiple of glass sheets.

As used herein, spatial or directional terms, such as "inner," "outer," "left," "right," "up," "down," "horizontal," "vertical," "upper," "lower," and the like, relate to the invention as it is shown in the figures. However, it is to be understood that embodiments of the present invention can assume various alternative orientations and, accordingly, such terms are not to be considered as limiting. Further, all numbers expressing dimensions, physical characteristics, and so forth, used in the specification and claims are to be understood as being modified in all instances by the term "about." Accordingly, unless indicated to the contrary, the numerical values set forth in the following specification and claims can vary depending upon the desired properties sought to be obtained by embodiments of the present invention. Moreover, all ranges disclosed herein are to be understood to encompass any and all subranges subsumed therein. Also, as used herein, terms such as "positioned on," "into contact with" or "supported on" mean positioned or supported on but not necessarily in direct surface contact with.

Figure 1:
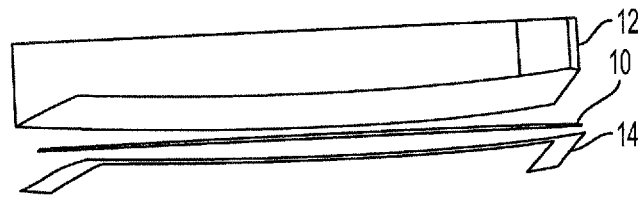
FIGS. 1 and 2 illustrate successive steps in a prior art glass panel fabrication process.
Figure 2:
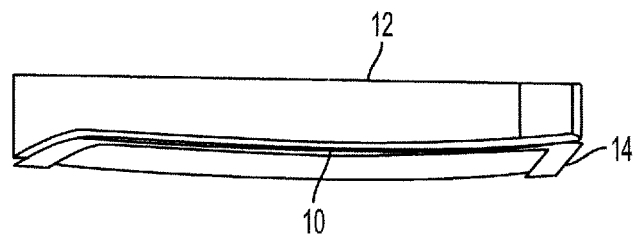

In a glass fabrication process, glass sheets are heated, formed into a desired shape, and annealed in, for example, a lehr. FIGS. 1 and 2 illustrate successive steps in a prior art glass panel fabrication process and, in particular, a prior art glass shaping process. In FIG. 1, a glass sheet 10, which is to be formed into a desired shape for, for example, a vehicle windshield, is positioned between an upper press 12 and a lower press, or press ring, 14. As illustrated in FIG. 2, either the upper press 12, the lower press ring 14, or both the upper press 12 and the lower press ring 14 are moved so that the glass sheet 10 is formed to its desired shape due to the forces exerted on the glass sheet 10 by the upper press 12 and the lower press ring 14. The lower press ring 14 may be either a ring that contacts the perimeter of the glass sheet 10 or a mold that contacts all or a substantial portion of the glass sheet 10.

Figure 3:
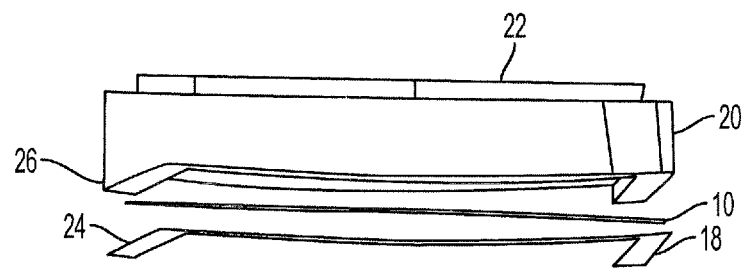
FIGS. 3-5 illustrate successive steps in a glass panel fabrication process in accordance with various embodiments of the present invention.
Figure 4:
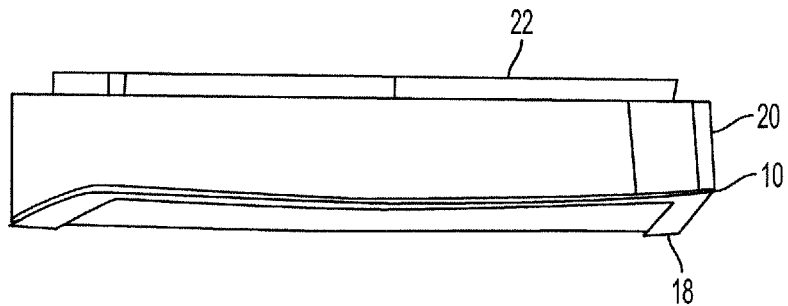
Figure 5:
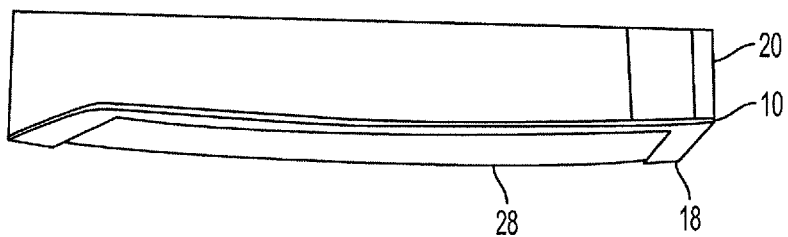

FIGS. 3-5 illustrate successive steps in a glass panel fabrication process in accordance with various embodiments of the present invention. As shown in FIGS. 3-5, a glass panel, such as a vehicle windshield, is formed into a desired shape using a multi-stage pressing process. As illustrated in FIG. 3, the glass sheet 10 is positioned between a lower press ring 18 and an upper press ring 20. An upper press 22, positioned within the upper press ring 20, is in a retracted position in which its lower surface 28 is located above the bottom face of the upper press ring 20. As illustrated in FIG. 4, in various embodiments either the upper press ring 20, the lower press ring 18, or both the upper press ring 20 and the lower press ring 18 are moved toward each other so that the glass sheet 10 is brought into contact with an upper surface 24 of the lower press ring 18 and a lower surface 26 of the upper press ring 20. The glass sheet 10 is thus clamped in place by the lower press ring 18 and the upper press ring 20. The perimeter of the glass sheet 10 is formed into the desired shape as defined by the shape of the lower press ring 18 and the upper press ring 20 when the press rings 18, 20 clamp the perimeter of the glass sheet 10. However, the area inside of the perimeter of the glass sheet 10, including the portion in the middle of the glass sheet 10, is not formed into its desired shape by such clamping.

As illustrated in FIG. 5, after the glass sheet 10 is clamped into place by the press rings 18, 20, the upper press 22 is actuated in a downward direction within the upper press ring 20 such that an area inside of the perimeter of the glass sheet 10 (e.g., a middle area) is formed in the shape of the lower surface 28 (as seen through the glass sheet 10 in FIG. 5) of the upper press 22. It can be understood that the upper press 22 may be disposed in the upper press ring in any suitable manner and in one embodiment may be coaxially located within the upper press ring 20. The press rings 18, 20 and the upper press 22 may be constructed of, for example, billet steel, cast iron, ceramic, or any combination of the aforementioned materials. It can be understood that protective cloths (not shown) may be employed to protect the surface of the glass sheet 10 from the various surfaces of the press rings 18, 20 and the upper press 22. Such cloths may be constructed of, for example, stainless steel or a stainless steel/fiber cloth composite.

The process illustrated in FIGS. 3-5 has the advantage that it produces lower perimeter strain on the glass sheet 10 and thus perimeter distortion is reduced. Also, the process results in a lower and more evenly distributed strain on the glass sheet 10 during forming.

Figure 6:
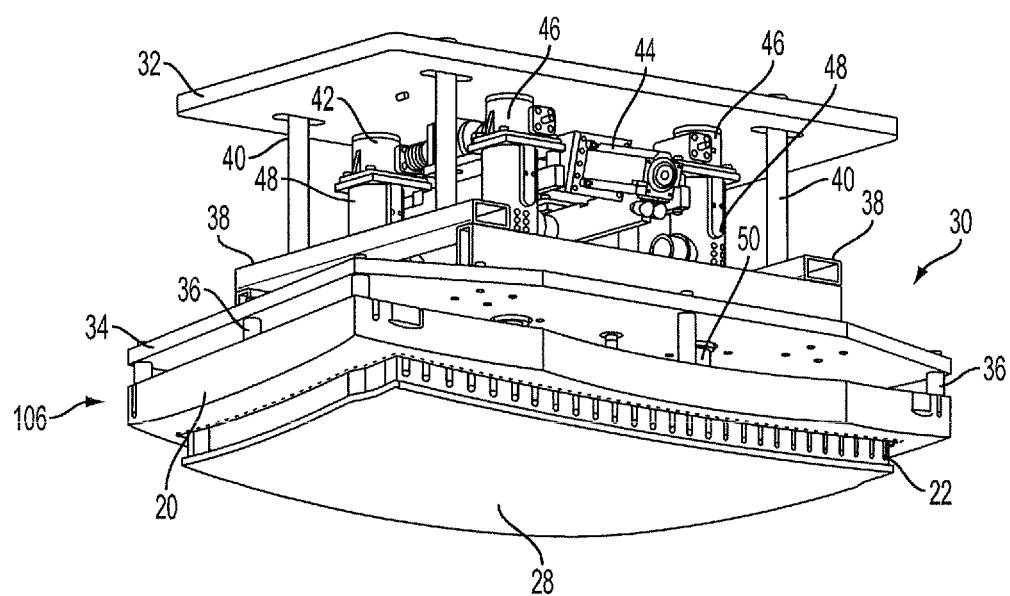
FIG. 6 illustrates a perspective view of a glass press assembly that incorporates various elements of FIGS. 3-5 according to various embodiments of the present invention.

FIG. 6 illustrates a perspective view of a glass press assembly 30 that incorporates various elements of FIGS. 3-5 according to various embodiments of the present invention. As illustrated in FIG. 6, the assembly 30 is fixed in place with a mounting plate 32. The mounting plate 32 rigidly affixes the assembly 30 to, for example, a structural element of a tool on which the assembly 30 is mounted or a structural or mounting element of a building in which the assembly is housed. A lower plate 34 is attached to the upper press ring 20 via supports 36. The lower plate 34 is in turn attached, via a frame 38 and supports 40, to the mounting plate 32. An upper press positioning assembly 42 operates to raise and lower the upper press 22 within the upper press ring 20. The assembly 42 includes a reversible power source 44, such as a motor, that actuates piston assemblies 46. In various embodiments, the power source 44 may include an electric servo motor that incorporates a ball screw drive mechanism, an air cylinder, or any other type of hydraulically driven, cam driven, or air driven power source. Piston housings 48 of the piston assemblies 46 are each attached at one end to the mounting plate 32 and at the other end to the lower plate 34. Piston rods 50 that extend downward from the housings 48 of each of the piston assemblies 46 are attached to a top surface 52 of the upper press 22. Actuation of the piston assemblies 46 thus causes the upper press 22 to raise and lower within the confines of the upper press ring 20.

Figure 7:
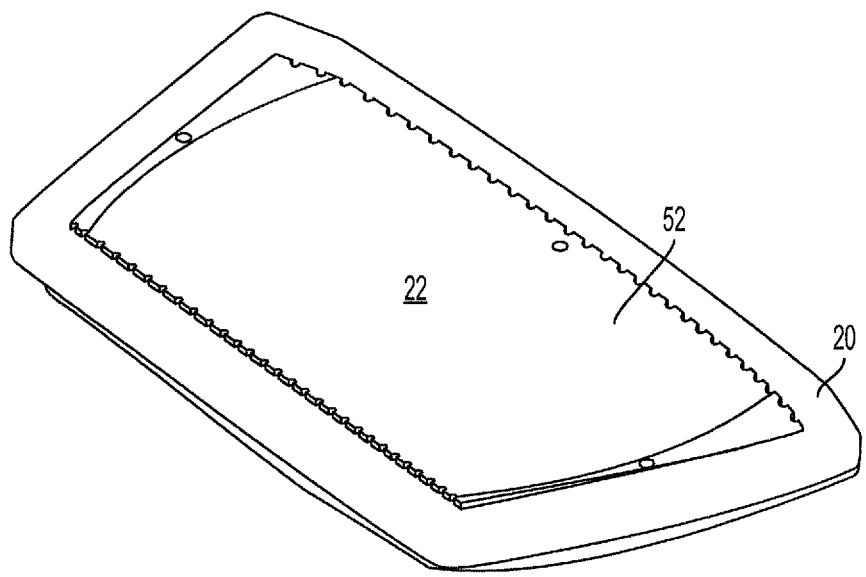
FIG. 7 illustrates a top perspective view of the upper press ring and the upper press according to various embodiments of the present invention.
Figure 8:
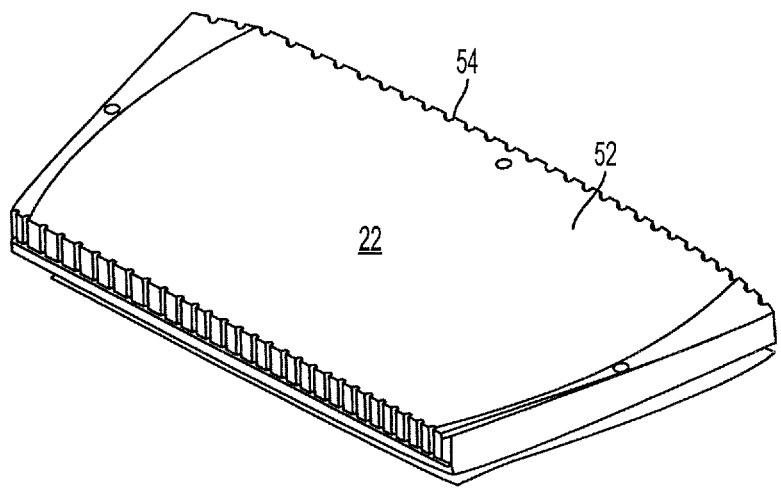
FIG. 8 illustrates a top perspective view of the upper press according to various embodiments of the present invention.

FIG. 7 illustrates a top perspective view of the upper press ring 20 and the upper press 22 according to various embodiments of the present invention. FIG. 8 illustrates a top perspective view of the upper press 22, as removed from the upper press ring 20, according to various embodiments of the present invention. As illustrated in FIG. 8, the upper press 22 may include a plurality of notches 54 that align with a plurality of protrusions (not shown) located on an inside surface of the upper press ring 20 so that the upper press ring remains in alignment during operation.

Embodiments of the present invention are directed to a process of forming glass sheets into a desired shape. The process may be used on glass sheets that are heated to a relatively low temperature without compromising the effectiveness of the process. Embodiments of the process and apparatus disclosed herein allow for a reduction in distortion of the formed glass and allow relatively complex shapes to be formed out of glass sheets. It can be understood that the process and apparatus disclosed herein may be used with or without the aid of a vacuum device used in the glass forming process. It can be understood that, although embodiments of the present invention are described herein as including two steps in the glass forming process (i.e., perimeter forming and center forming), any number of steps may be used as part of a multi-stage process to form a glass sheet into a desired shape. For example, after the perimeter of the glass sheet is clamped (i.e., formed), multiple upper presses may be used to form various portions of the glass sheet into a desired shape.

Figure 9:
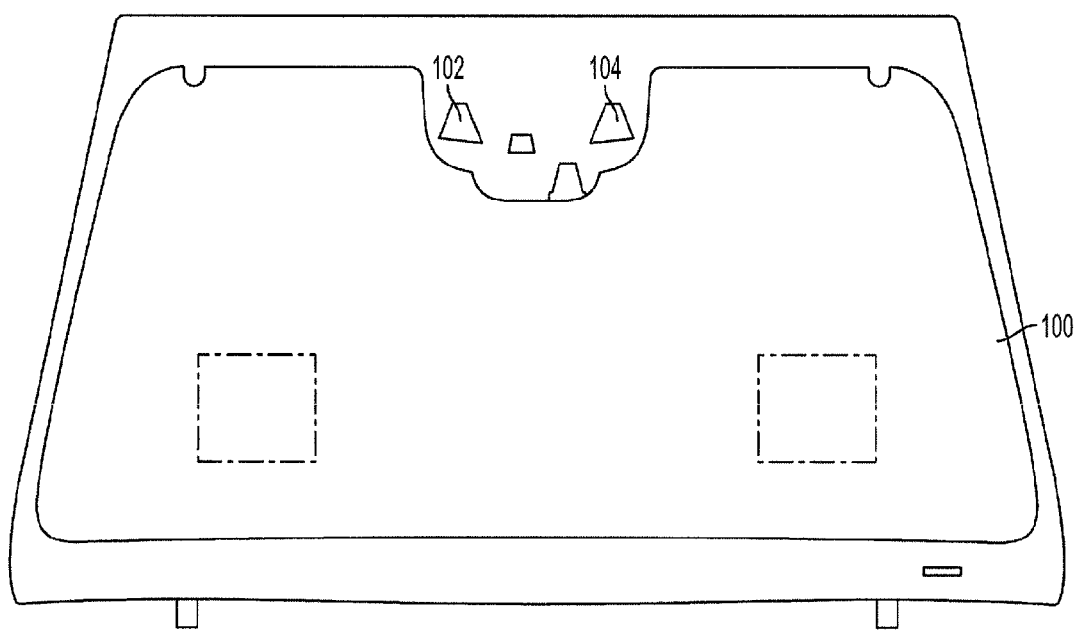
FIG. 9 is an illustration of a windshield having camera viewing areas for use in a vehicle with optical controls of a type suitable for braking and suspension systems.

FIG. 9 illustrates a windshield of the type that is used in vehicles having optically augmented braking or suspension systems such as previously discussed herein. In FIG. 9, a windshield 100 illustrates two viewing areas 102 and 104 through which respective cameras (not shown) capture images of the advancing roadway as the vehicle is moving. The cameras provide optical inputs to the augmented systems. The augmented breaking, suspension or other control system reacts according to a predictive algorithm that requires optical inputs with relatively high resolution, sensitivity and response time in comparison to optical systems previously known in the automotive industry. One consequence of such higher performance demands is that the images available to the cameras through the windshield must be free of optical distortions that previously were acceptable. Accordingly, the camera optical sensors view images through viewing areas 102 and 104 that afford improved fidelity of images viewed therethrough.

Improvements in the image quality seen through viewing areas 102 and 104 is generally realized through improved dimensional control of the windshield within areas 102 and 104. In accordance with the presently disclosed invention, this is accomplished through one or more improvements in the manufacturing processes and apparatus that are used to make windshield 100.

Figure 10:
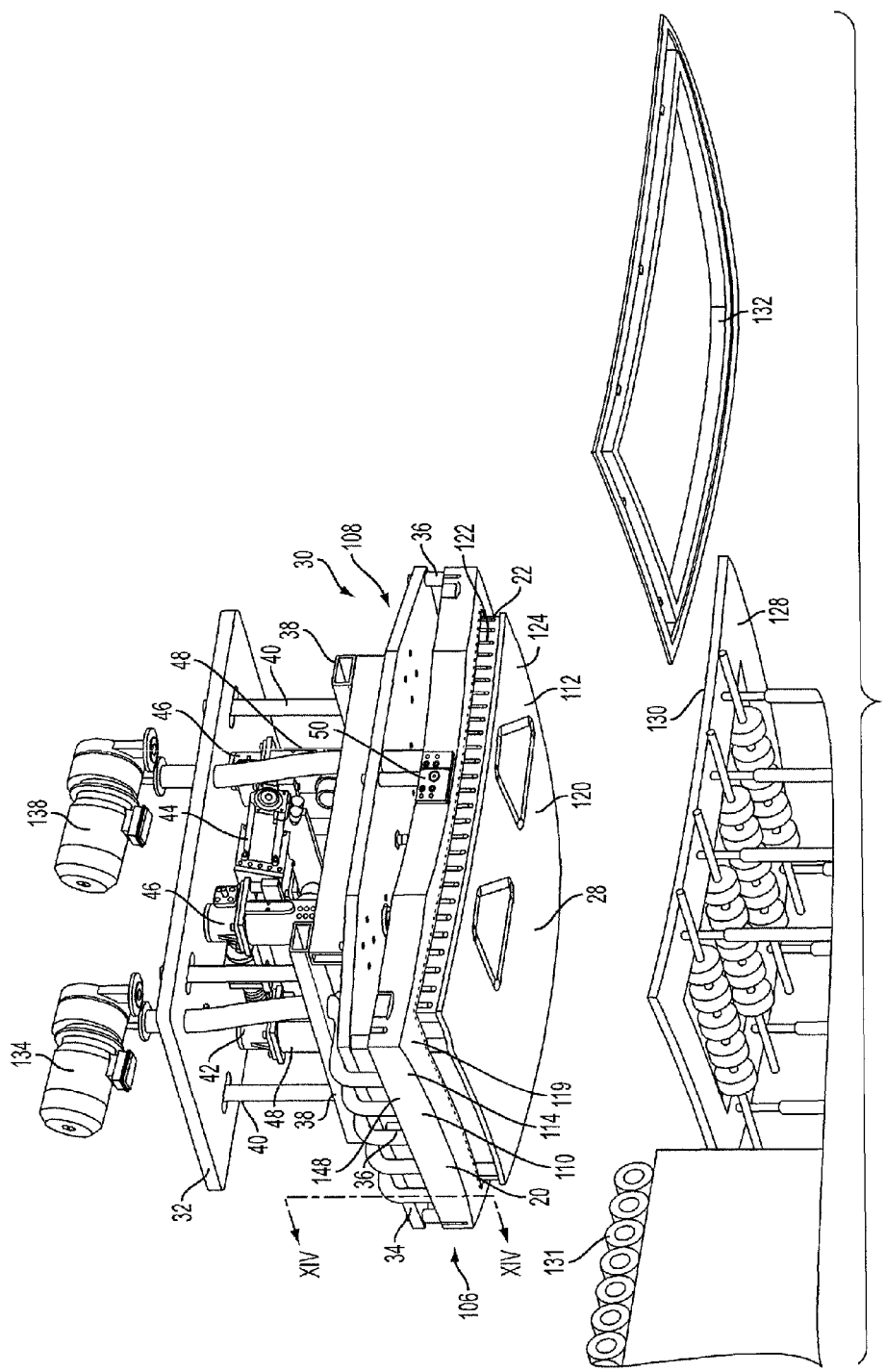
FIG. 10 is a perspective view of a press assembly that incorporates various elements of FIGS. 10A-16 in accordance with the presently disclosed invention.
Figure 12:
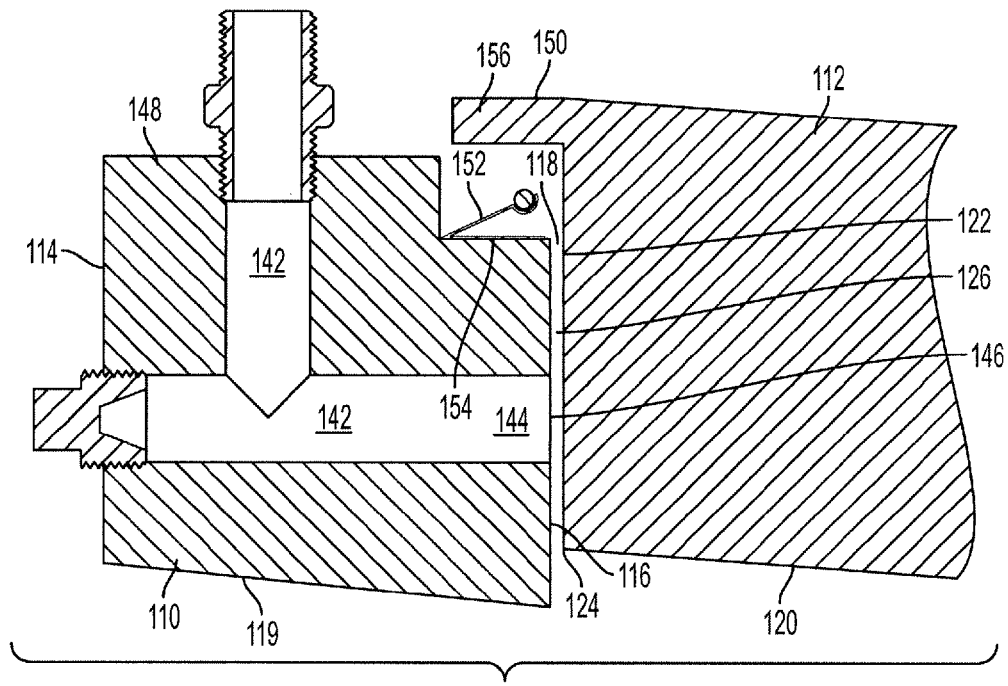
FIG. 12 is a cross-section of the upper press ring and the inner press of FIG. 10 wherein the vacuum in the gap between the upper press ring and the inner press is supplied through an opening in a wall of the upper press ring that cooperates with a seal in the gap.

FIG. 10 illustrates an embodiment of the disclosed multi-stage press wherein a vacuum forming process is used, at least in part, to form the portions of windshield 100 that are included in viewing areas 102 and 104. FIG. 10 is a perspective view of a multistage press 106 that includes an upper press assembly 108. Upper press assembly 108 includes an upper press ring 110 and an inner press 112. FIGS. 6 and 12 show an upper press ring 110 that defines an outer peripheral edge 114 and an oppositely disposed wall 116 that defines a central opening 118 in upper press ring 110. Upper press ring 110 further defines a forming surface 119 between the outer peripheral edge 114 and wall 116.

FIGS. 6 and 12 further show that inner press 112 defines a face surface 120 and an outer peripheral side 122 that terminates in a peripheral edge 124 at the intersection of peripheral side 122 and face surface 120. Inner press 112 is located in central opening 118 of upper press ring 110 so as to define a gap 126 between the peripheral side 122 of inner press 112 and wall 116 that defines the central opening of upper press ring 110.

Inner press 112 is moveable within the central opening 118 of upper press ring 110 between a retracted position and a forming position. In the retracted position, inner press is withdrawn from the forming surface 119 of upper press ring 110 such that peripheral edge 124 of inner press 112 is inside or recessed into the central opening 118 of upper press ring 110. When inner press 112 is located at the forming position, peripheral edge 124 of inner press 112 is located away from the retracted position and closer to the forming surface 119 of upper press ring 110. When inner press 112 is in the forming position, peripheral edge 124 is essentially laterally even with forming surface 119.

Multistage press 106 further includes a lower press ring 128. Lower press ring 128 has a clamping surface 130 that is oriented with respect to forming surface 119 of upper press ring 110 such that it opposes or oppositely faces forming surface 119. At least one of lower press ring 128 and upper press ring 110 are moveable with respect to each other such that forming surface 119 and clamping surface 130 can be moved toward each other to clamp the ply between forming surface 119 and clamping surface 130. Lower press ring 128 and upper press ring 110 are also moveable in the opposite direction away from each other such that when upper press ring 110 and lower press ring 128 are moved apart, a ply that is clamped between forming surface 119 and clamping surface 130 will be released from between those surfaces.

Similar to the embodiment of FIGS. 3-6, the embodiment of the multistage press illustrated in FIG. 10 forms a ply when feeder rolls 131 or other mechanisms move the ply to a location between upper press assembly 108 and lower press ring 128 at times when the lower press ring 128 and the upper press assembly are vertically apart and inner press 112 is in the retracted position with respect to upper press ring 110. While inner press 112 remains in the retracted position, upper press ring 110 and lower press ring 128 are then closed together such that an outer perimeter band of the ply is clamped between forming surface 119 of upper press ring 110 and clamping surface 130 of lower press ring 128. Surfaces 119 and 130 are spaced apart such that the outer perimeter band of the ply that is clamped therebetween is formed according to the profiles of surfaces 119 and 130. Face surface 120 of inner press 112 does not touch the ply at this time because inner press 112 is still in the retracted position.

After the outer perimeter band of the ply is clamped between surfaces 119 and 130 and pressed into form according to the profiles of surfaces 119 and 130, inner press 112 is moved from its retracted position to its forming position as previously described herein. As inner press 112 is moved from the retracted position to its forming position, the face 120 of inner press 112 contacts the ply and presses the center portion of the ply into a shape according to the profile of face 120. In accordance with the presently disclosed invention, it has been found that, because the outer perimeter band of the ply is clamped, the ply is pressed into the profile that is defined by surfaces 119 and 130 and face 120 with less distortion and fewer optical imperfections than plies that are formed by first pressing the center of the ply and then forming the final shape of the ply by pressing the outer perimeter margins of the ply.

To form plies at a faster rate, the presently disclosed embodiment further includes a mechanism for transferring the formed ply away from the press without excessive delay time for the ply to cool. In the embodiment, a cold ring 132 is used to receive the ply from the upper press assembly 108. More specifically, a vacuum source 134 is in fluid communication with the gap 126 between wall 116 and peripheral side 122. After the ply has been formed as described above, the vacuum source 134 applies a partial vacuum within gap 126 as is hereinafter more fully explained in connection with FIGS. 12 and 13. The partial vacuum is first established when surfaces 119 and 130 have been closed to form the outer perimeter band of the ply and inner press 112 has been moved to its forming position to form the center of the ply. With the partial vacuum applied at this stage, lower press ring 128 and upper press assembly 108 are moved vertically apart while inner press 112 remains in the forming position.

Due to the partial vacuum in gap 126, as lower press ring 128 moves away from upper press assembly 108, atmospheric pressure against the side of the ply opposite from upper press assembly 108 maintains the ply against upper press assembly 108. While the ply is thus maintained against upper press assembly 108, a cold ring 132 is positioned to receive the formed ply.

Cold ring 132 is laterally moveable between upper press assembly 108 and lower press ring 128 at times when the upper press assembly and the lower press ring are moved apart from each other. When cold ring 132 is positioned vertically below upper press assembly 108, the vacuum between vacuum source 134 and gap 126 is interrupted. The change in air pressure around the ply allows the ply to fall away from upper press assembly 108 to be received by cold ring 132. Cold ring 132 then carries the formed ply laterally away from between upper press assembly 108 and lower press ring 128 and the next ply to be formed is positioned between upper press assembly 108 and lower press ring 128.

Figure 10A:
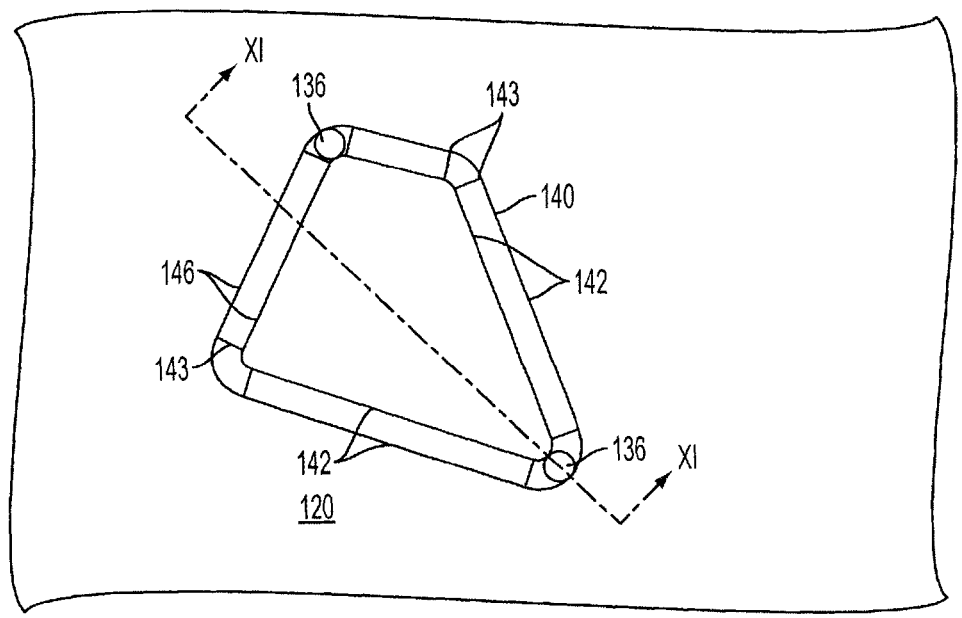
FIG. 10A shows a portion of the face surface of an inner press that is included in a system for vacuum forming camera viewing areas such as illustrated in FIG. 9.
Figure 11:
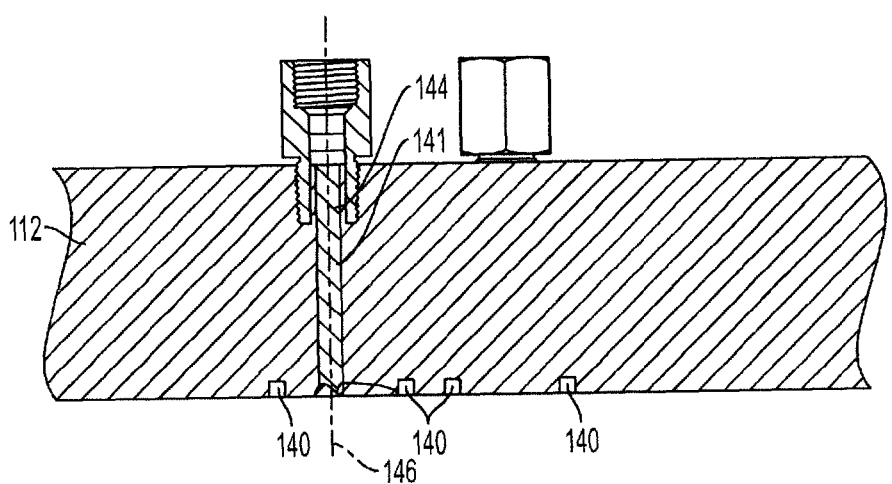
FIG. 11 is an elevation of the inner press shown in FIG. 10A taken along the lines XI-XI of FIG. 10A.

As more particularly disclosed in connection with FIGS. 10A and 11, the presently disclosed embodiment utilizes vacuum forming to further improve optical quality and dimensional fidelity in selected areas of the ply such as illustrated by camera viewing areas 102 and 104 of FIG. 9. FIG. 10A is a bottom plan view of a portion of face surface 120 of inner press 112 that applies vacuum forming to selected areas of the face surface. As shown in FIG. 10A, face surface 120 includes at least one opening 136. In the particular embodiment of FIG. 10A, two openings 136 are shown although any number of such openings are within the contemplation of the present disclosure. A vacuum source is in communication with the openings 136. In the presently disclosed embodiment, the vacuum source is a vacuum pump 138 that is independent of the vacuum source that is used to maintain the formed ply on the upper press assembly 108. However, it will be apparent to those skilled in the art that vacuum pump 138 could be combined with vacuum source 134 as a single vacuum source and that many other available configurations of a vacuum supply are also within the scope of the subject disclosure.

Openings 136 are associated with the vacuum pump 138 to selectively apply additional pressure to the ply with the area of openings 136 so as to form the ply in that area by vacuum forming. As particularly shown in FIGS. 10A and 11, openings 136 include a slot 140 in face surface 120 of inner press 112. Preferably, slot 136 is in the form of a closed loop that defines the perimeter of the area that is vacuum formed. Slot 140 is in fluid communication with vacuum pump 138 by a passageway 141 through inner press 112. Preferably, slot 140 may include a family of parallel slots 142 that may be two or more slots. In addition, slot 140 may further include a plurality of cross-channels 143 that extend between two or more parallel slots 142.

As particularly shown in FIG. 11, in some embodiments, passageways 141 may form borings 144 through inner press 112. Each of borings 144 has a longitudinal axis 146 that is parallel to the direction of travel of inner press 112 as it moves between the retracted position and the forming position. In some embodiments, the openings 136 correspond to a plurality of respective passageways 141 such that the openings form a pattern that corresponds to the portion of the face surface 120 wherein the ply is at least partially formed by vacuum or, in some cases, is formed by vacuum in combination with mechanical pressure of the multistage press.

In accordance with the disclosed embodiment, vacuum pump 138 may include controls for regulating the vacuum pressure in the opening that includes openings 136, parallel slots 142, and cross-channels 143. The vacuum in openings 136, slots 142, and cross-channels 143 or other opening 136 is sufficient to contribute to forming the ply in the portion of the face surface 120 that is enclosed by slots 142.

Figure 13:
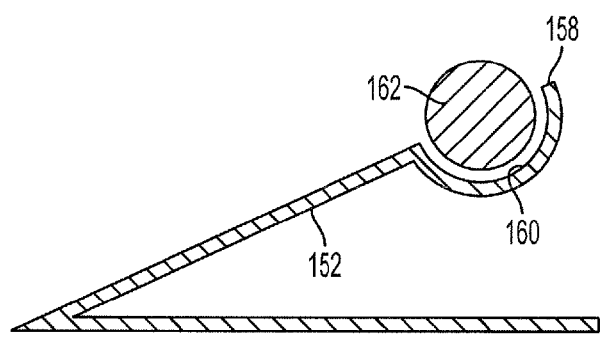
FIG. 13 is an enlarged view of the seal shown in FIG. 12.

FIGS. 12 and 13 disclose further details of an embodiment wherein the fluid communication between the vacuum source 134 and gap 126 includes at least one passageway 142 through upper press ring 110. Each of passageways 142 has one end 144 that terminates in a respective opening in wall 116 of central opening 118. Preferably, the fluid communication between vacuum source 134 and gap 126 includes a plurality of passageways 142 that are spaced apart from each other around the perimeter of upper press ring 110.

In some embodiments, the upper press ring 110 and the inner press 112 cooperate with further structure to control the application of vacuum to gap 126. FIG. 12 shows that upper press ring 110 defines a top surface 148 that is oppositely disposed on the upper press ring from forming surface 119. Inner press 112 defines a top surface 150 that is oppositely disposed on inner press 112 from face surface 120. In this embodiment, multistage press 106 includes a seal 152 that is located between upper press ring 110 and inner press 112. Seal 152 is positioned between the peripheral side 122 of upper press ring 110 and wall 116 of inner press 112 so as to block the flow of air from between top surface 148 and top surface 150 and through gap 126 to opening 146 in wall 116 at times when inner press 112 is in the forming position. In addition, seal 152 allows the flow of air from between top surfaces 148 and 150 through gap 126 to opening 146 at times when inner press 112 is in the retracted position. This structure allows the multistage press to apply a vacuum from the opening 146 in wall 116 at times when inner press 112 is in the forming position so that atmospheric pressure against the exposed surface of a ply (i.e. the surface oppositely disposed on the ply from the surface of the ply that faces upper press assembly 108) will retain the formed ply on the upper press assembly. To break the partial vacuum and release the formed ply from the upper press assembly, the inner press 112 is moved in the direction of the retracted position to a point at which the seal 152 allows airflow from between top surfaces 148 and 150 through gap 126 to opening 146. The pathway for air flow breaks the partial vacuum between the ply and the upper press assembly to allow the ply to fall away from the upper press assembly.

In the embodiment of FIGS. 12 and 13, the wall 116 of central opening 118 defines a seat 154 to support seal 152. Peripheral side 122 of inner press 112 defines a flange 156. Flange 156 extends radially outward and over the radial position of seal 152 such that at times when inner press 112 is in the forming position seal 152 cooperates with flange 156 to block airflow through gap 126 past seal 152. Those skilled in the art will understand that a seat for seal 152 alternatively could be established in peripheral side 122 of inner press 112.

In some embodiments, seal 152 is a V-shaped seal of spring steel is shown in FIGS. 12 and 13. Also in some embodiments, the V-shaped seal has a distal end 158 that defines a trough 160. A rope packing 162 may be carried in trough 160 to improve the seal between the upper press ring 110 and the inner press 112.

Figure 14:
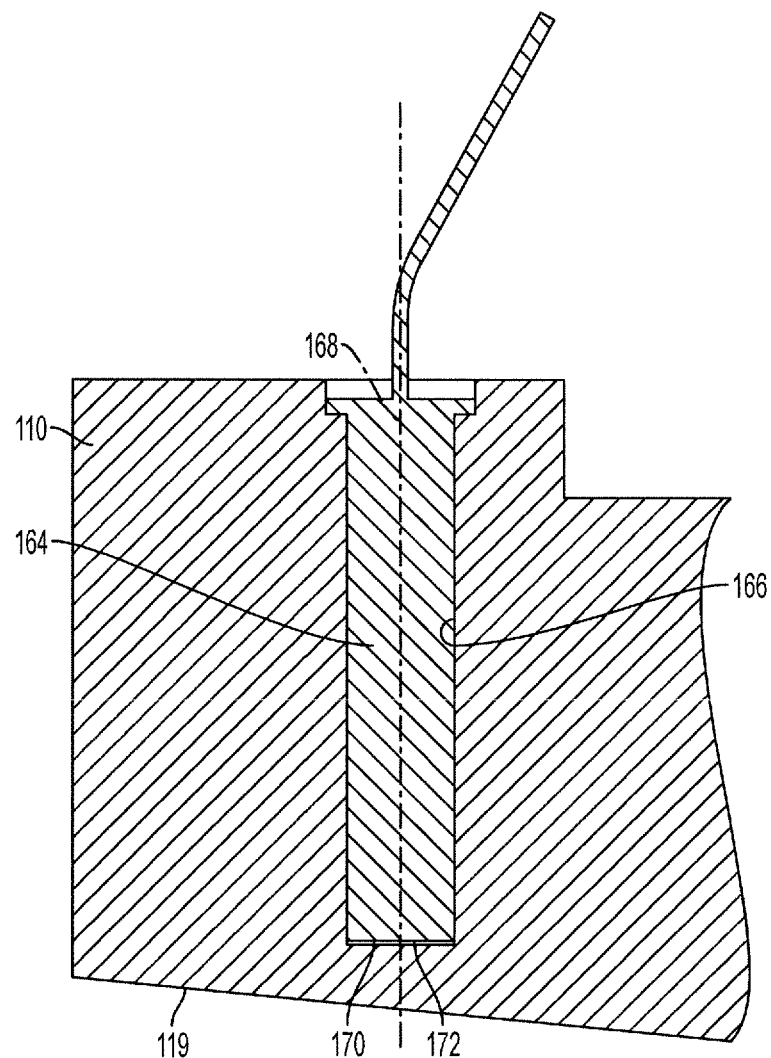
FIG. 14 is a partial elevation cross-section of the upper press ring shown in FIG. 10 taken along the lines XIV-XIV of FIG. 10 and showing the orientation of heaters used in the upper press ring.

In some embodiments, the multistage press 106 has heating elements 164 that are included in upper press ring 110 in an orientation that affords improved heating in comparison to heating element arrangements known in the prior art. As illustrated in FIG. 14, heating elements 164 are located in respective borings 166 that are advanced from the top surface 148 of upper press ring 110. Heating elements 164 are elongated along respective longitudinal axes 168 that are parallel to the direction of movement of inner press 112 between the retracted position and the forming position. The heating elements 164 define a longitudinal end 170 that has a centerpoint 172. Such orientation is preferred over heating elements known in the prior art because, among other reasons, it allows more uniform placement of the heating elements with respect to the forming surface 119 of upper press ring 110. More specifically, the respective centerpoints 172 of the respective longitudinal ends 170 of heating elements 164 are equidistant from forming surface 119 of upper press ring 110. Such location of heating elements 164 affords more uniform heating of the forming surface 119.

Also, preferably, borings 166 and the respective heating elements 164 are evenly spaced around upper press ring 110. Such uniform placement further affords more uniform heating of the forming surface 119 in comparison to prior art arrangements.

Figure 15:
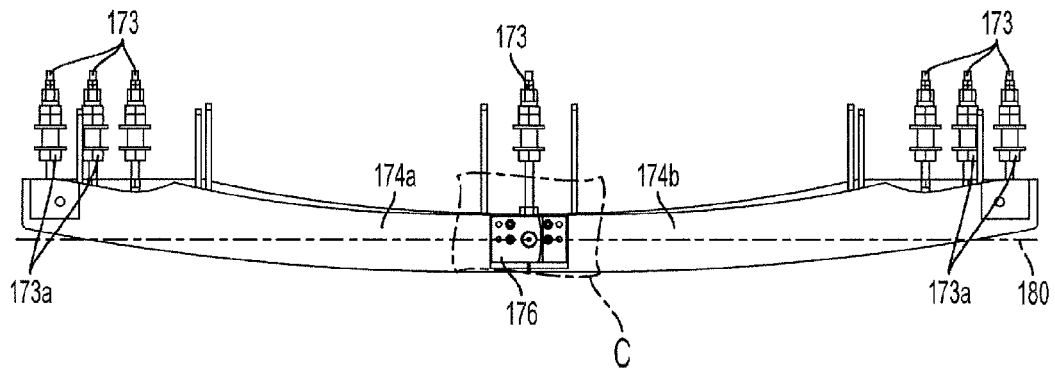
FIG. 15 is an assembly drawing of an upper press ring that includes a pivotal hinge.
Figure 16:
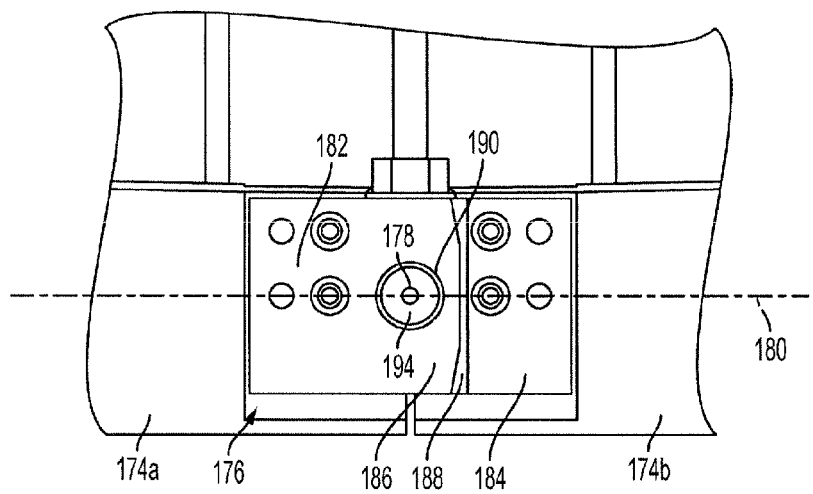
FIG. 16 is an enlargement of the portion of the upper press ring shown in FIG. 15 included in outline "C".
Figure 17:
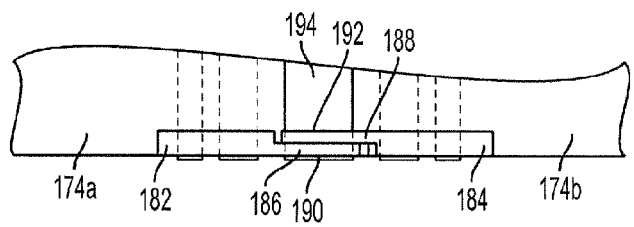
FIG. 17 is a plan view of the portion of the upper press ring shown in FIG. 16.

FIGS. 15, 16 and 17 illustrate an embodiment of the multistage press 106 in which the upper press ring 110 includes mechanical adjustments for positioning the upper press ring with respect to inner press 112. Upper press ring 110 includes a plurality of threaded adjustment pins 173. By rotating nuts 173a on the respective pins 173, upper press ring 110 can adjusted with respect to inner press 112 such that the forming surface 119 of upper press ring 110 can be adjusted in a vertical direction. This vertical adjustment can be used to cause forming surface 199 of upper press ring 100 to be even with face surface 120 of inner press 112.

However, it has been found that thermal stresses within upper press ring 110 may vary the contour of forming surface 119 to cause it to become misaligned with respect to face surface 120, notwithstanding the adjustment of upper press ring 110 that is available through adjustment pins 173. In accordance with the embodiments of FIGS. 15 and 16, upper press ring 110 may further include at least two segments 174a, 174b that are connected by pivotal joints 176. In the disclosed embodiment, pivotal joints 176 are located on respective opposite sides of upper press ring 110. Pivotal joints 176 allow segments 174a, 174b to pivot with respect to each other. In this way, the range of motion of one segment 174a, 174b in a normal direction with respect to the face surface 120 of inner press 112 is increased. Furthermore, one segment 174a can be moved in a directional sense that is either the same as or opposite from the directional sense in which the other segment 174b may be moved—depending on the adjustment that best matches face surface 120 of inner press 112. In this way, the upper press ring may be more closely adjusted to match the forming surface 119 of upper press ring 110 to the face surface 120 of inner press 112.

Preferably, pivotal joints 176 are located at the midpoint 178 of the major axis 180 of upper press ring 110. Location of pivotal joints 176 at the midpoint 178 allows the center of upper press ring 110 to be moveable in a direction that is normal to face surface 120 of inner press 112. In this way, the center portion of upper press ring 110 is also adjustable with respect to the face surface 120.

In one embodiment, each of pivotal joints 176 are arranged to secure movement of the forming surface 119 of a first segment 174a with respect to the forming surface 119 of the adjacent segment 174b in a direction that is normal with respect to the face surface 120 of inner press 112 adjacent to the pivotal joint 176. As more specifically shown in FIGS. 16 and 17, each of pivotal joints 176 includes a first block 182 that is secured to segment 174a and a second block 184 that is secured to the adjoining segment 174b. Block 182 includes a flange 186 that extends in the direction of block 184 and block 184 includes a flange 188 that extends in the direction of block 182. Flanges 186 and 188 overlap each other and each of flanges 186 and 188 have respective holes 190 and 192. Flanges 186 and 188 receive cylindrical pin 194 in holes 190 and 192. Such structure allows flanges 186 and 188 to angularly pivot about pin 194 with respect to each other such that forming surface 119 of outer press ring 110 may be adjusted with respect to face surface 120 of inner press 112. Pin 194 allows pivotal motion of flanges 186 and 188 and blocks 182 and 184 while preventing motion of flanges 186 and 188 and segments 174a, 174b in a shear direction, meaning movement of flanges 186, 188 and segments 174a, 174b in a direction aligned with the movement of inner press 112 between the retracted position and the forming position.

Figure 18:
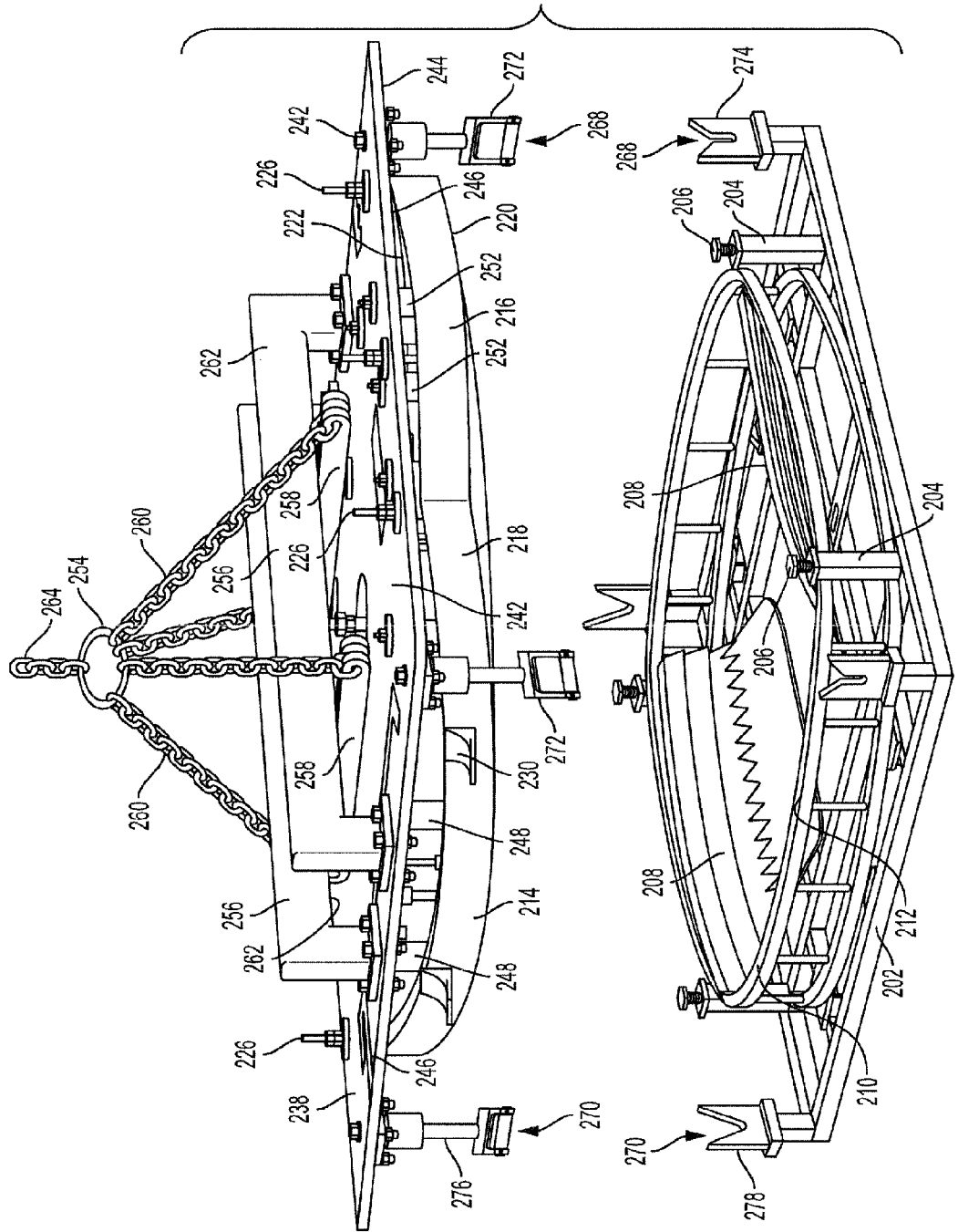
FIG. 18 is a perspective view of a two-stage gravity press, carrying frame and lower press ring in accordance with the structure further detailed in FIGS. 19-31.
Figure 19:
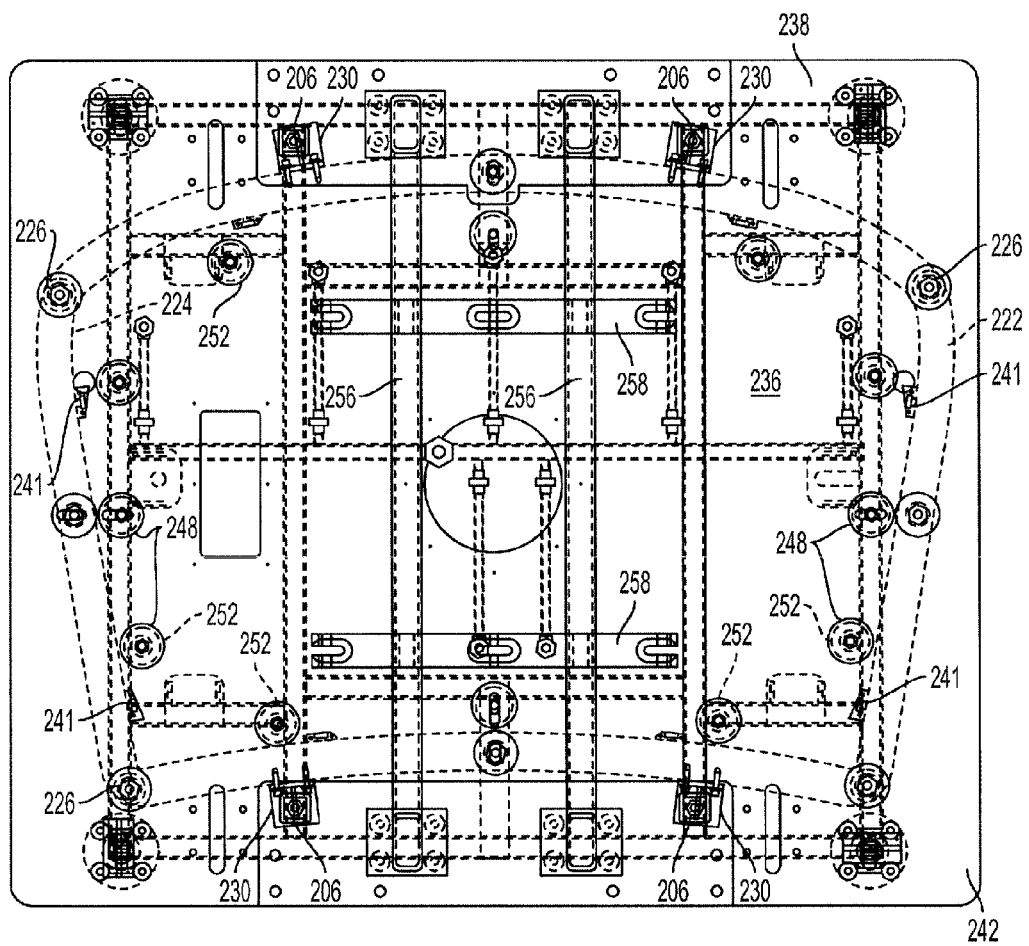
FIG. 19 is a plan view of the two-stage gravity press and carrying frame (excluding the lower press ring) shown in FIG. 18.
Figure 20:
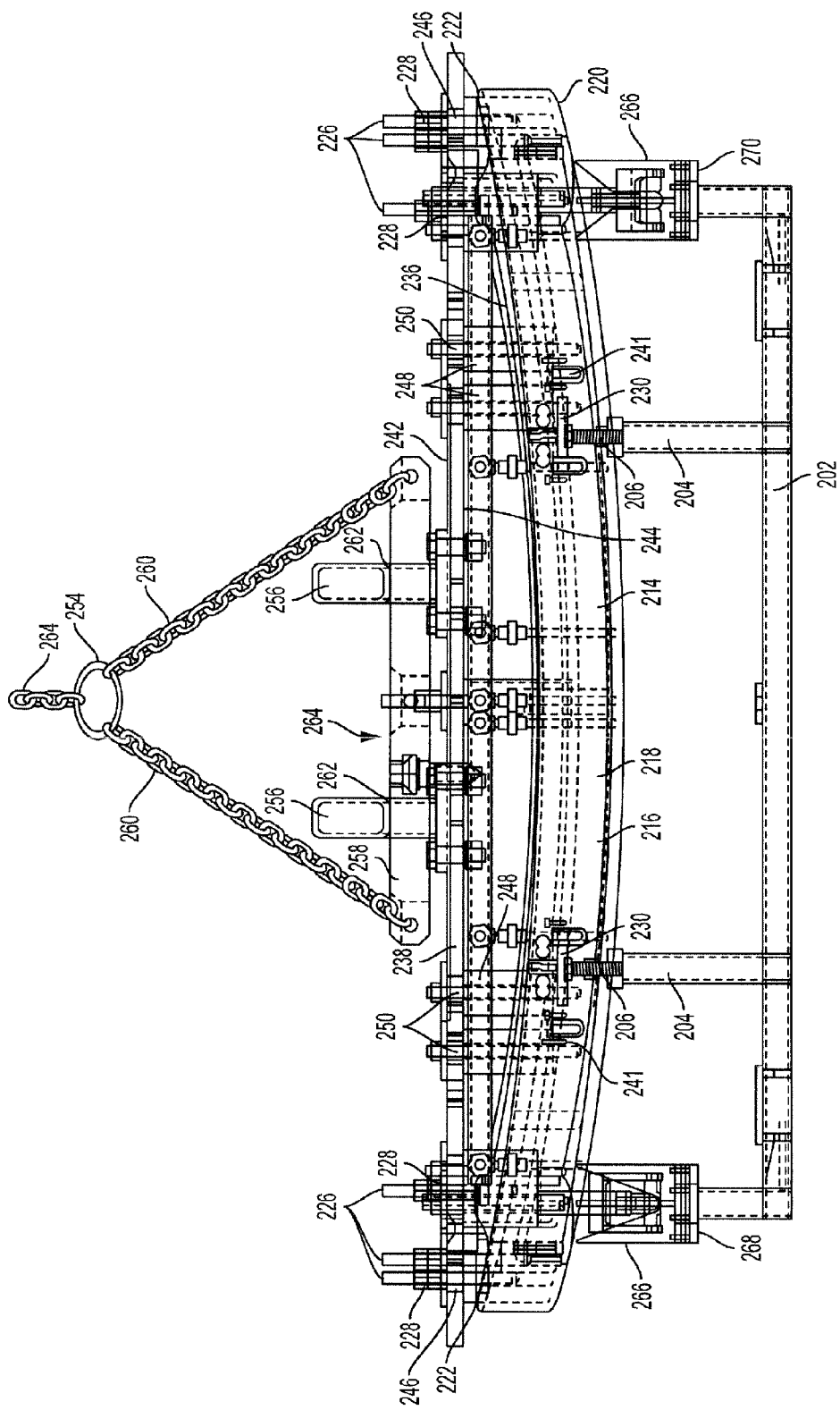
FIG. 20 is a rear elevation view of the two-stage gravity press and frame shown in FIG. 19.
Figure 21:
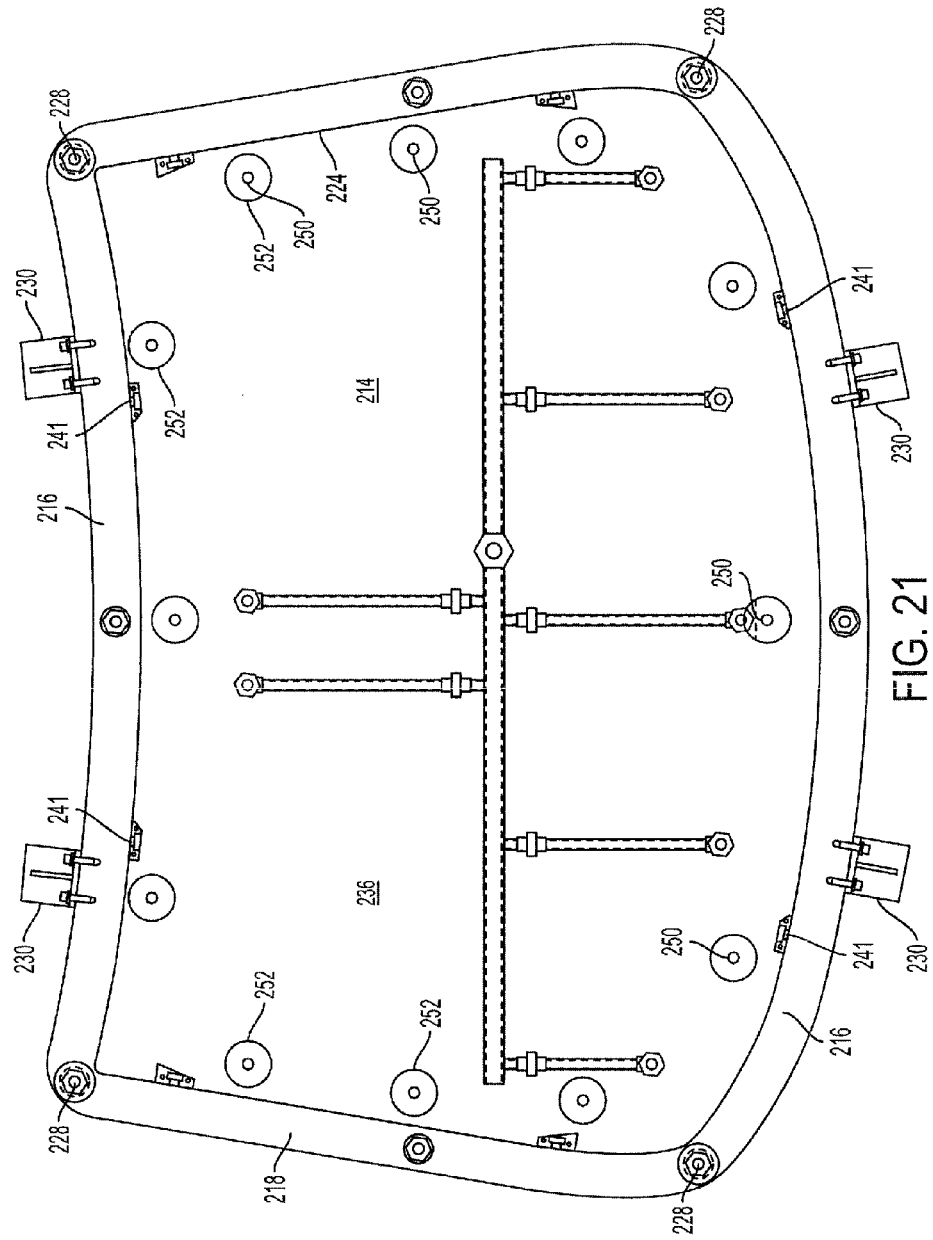
FIG. 21 is a plan view of the subassembly of the two-stage gravity press.
Figure 22:
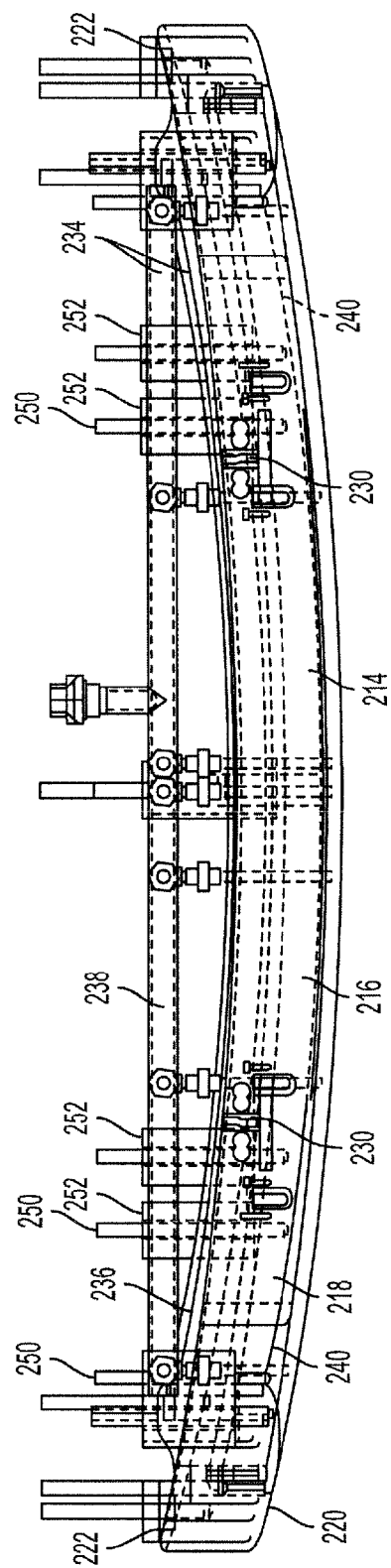
FIG. 22 is a front elevation view of the subassembly of the two-stage gravity press shown in FIG. 21.
Figure 23:
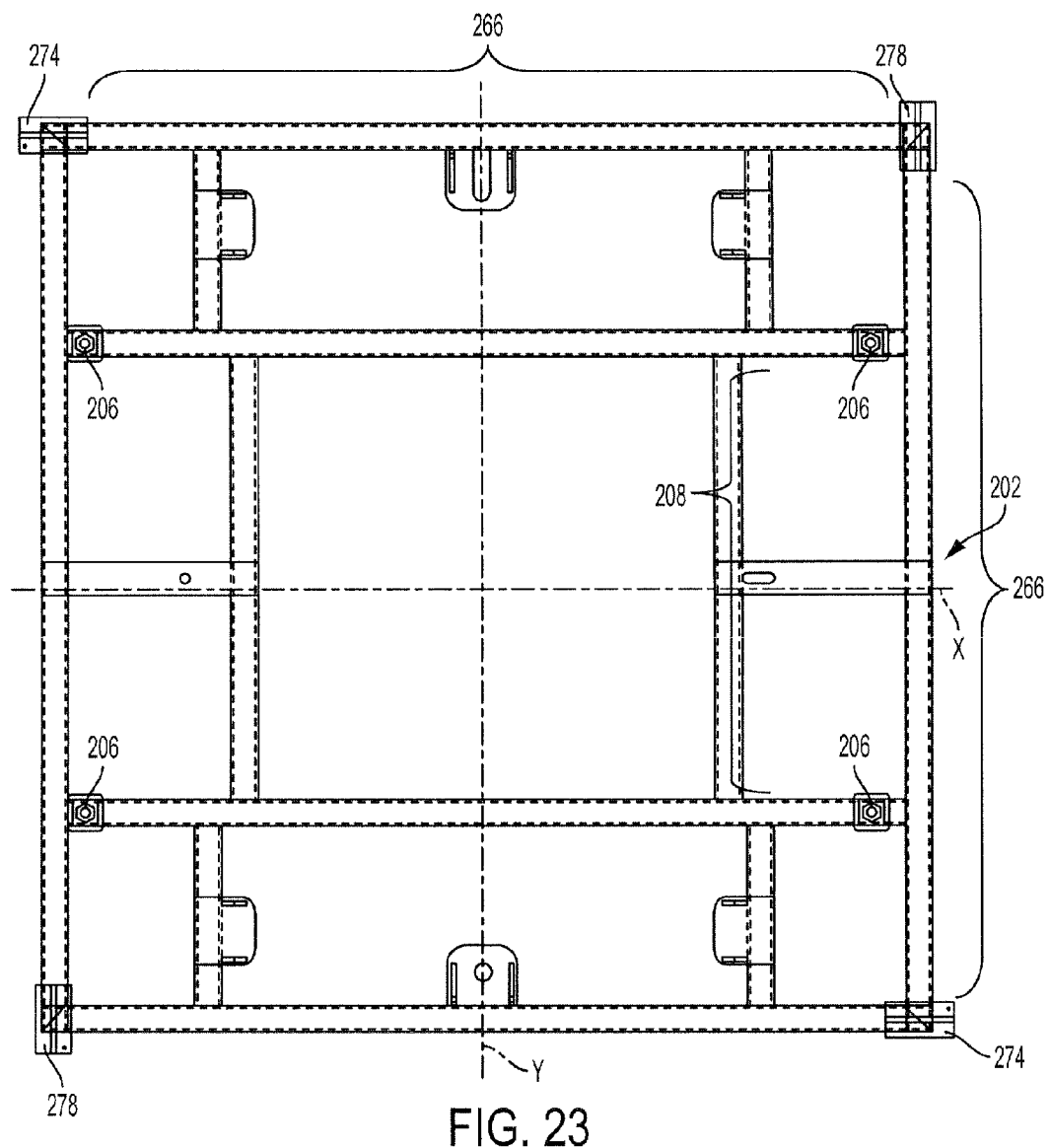
FIG. 23 is a plan view of the carrying frame assembly that is included in FIGS. 18, 19 and 20.
Figure 24:
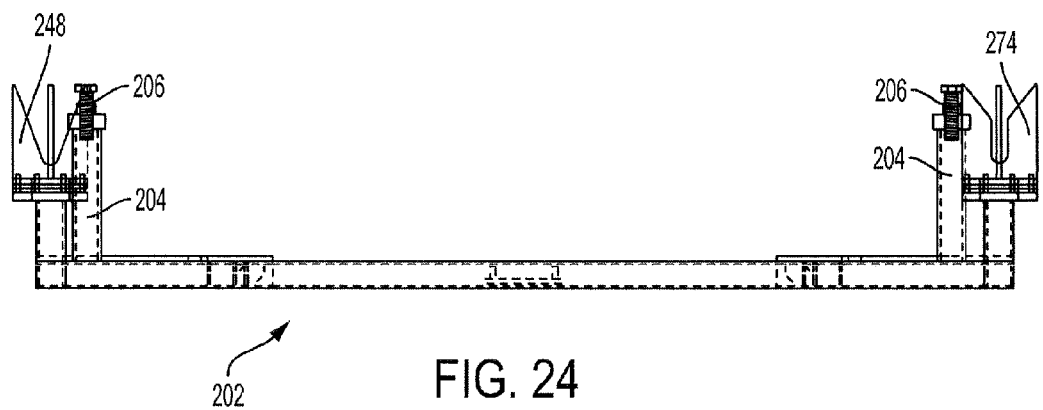
FIG. 24 is an elevation view of the carrying frame assembly that is shown in FIG. 23.
Figure 25:
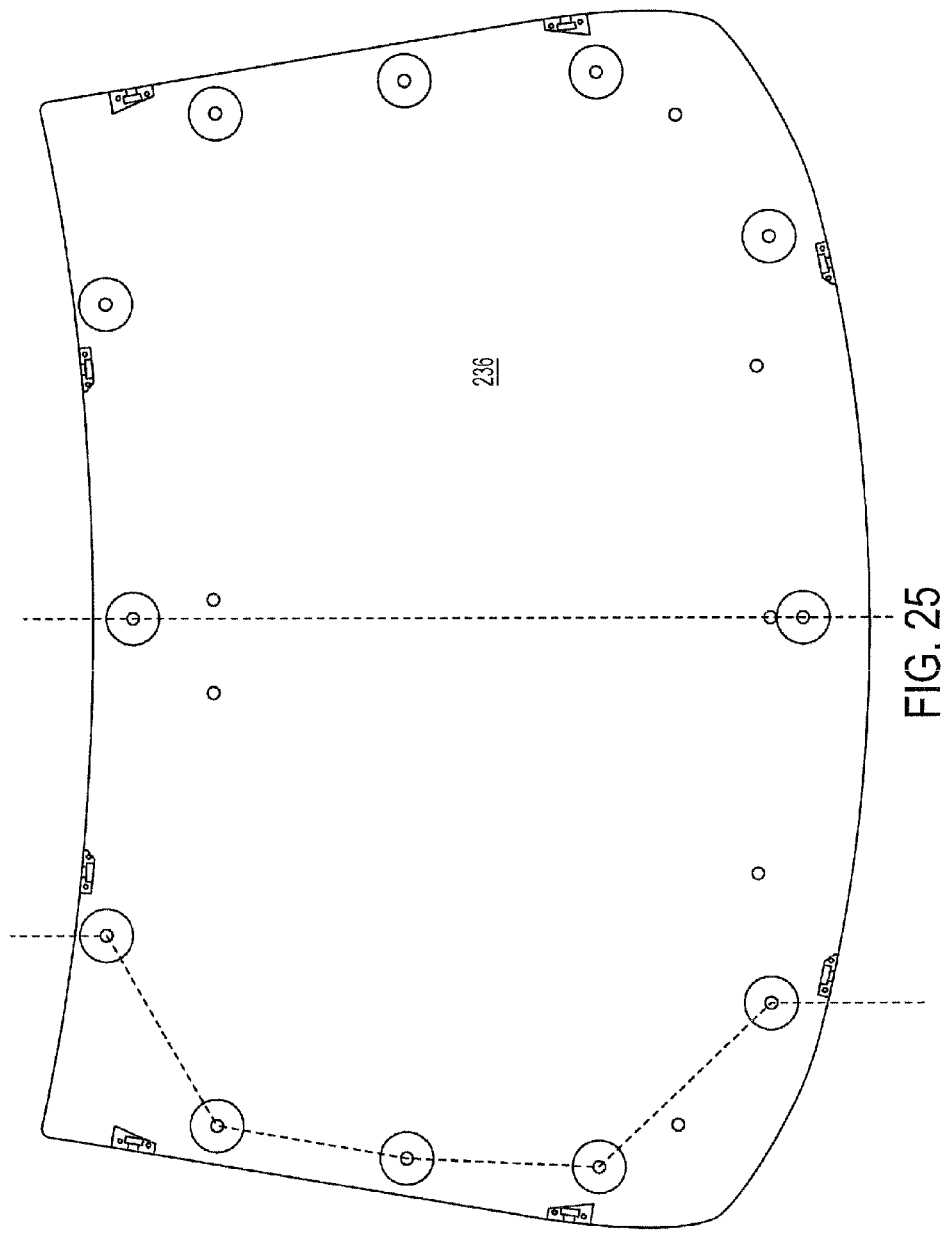
FIG. 25 is a part drawing of the inner press that is shown in FIGS. 18-22.
Figure 26:
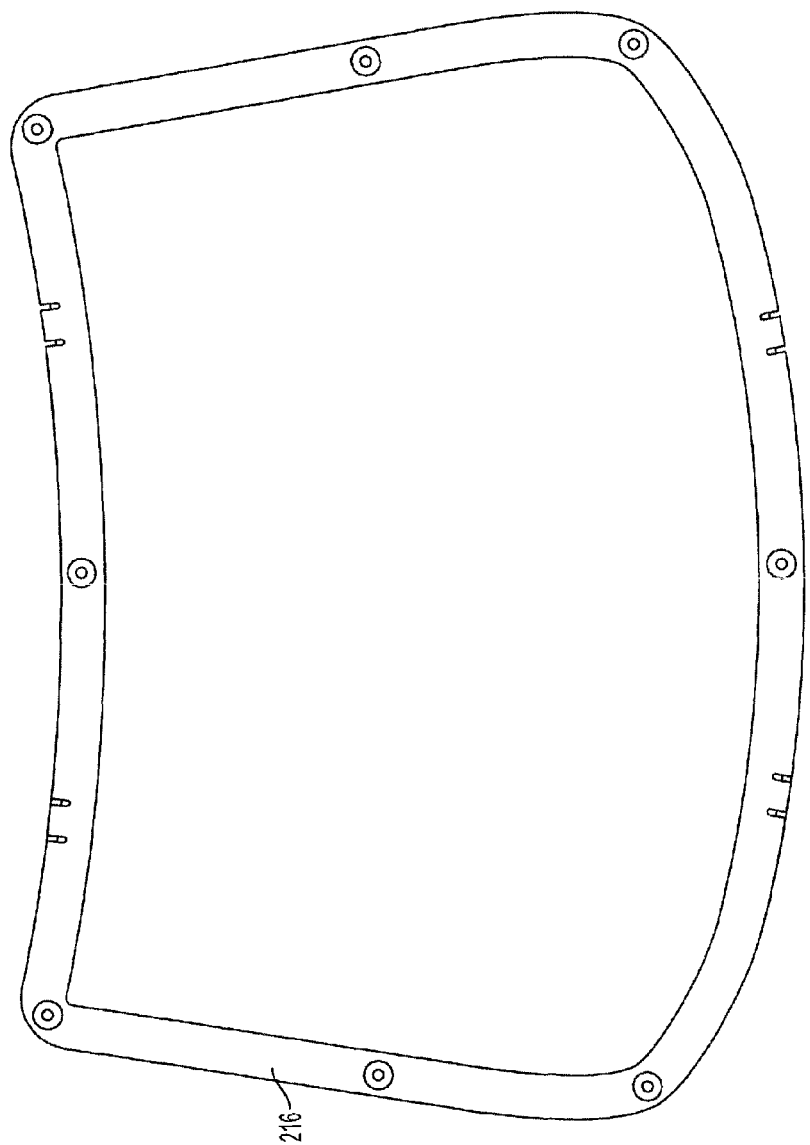
FIG. 26 is a part drawing of the upper press ring shown in FIGS. 18-22.
Figure 27:
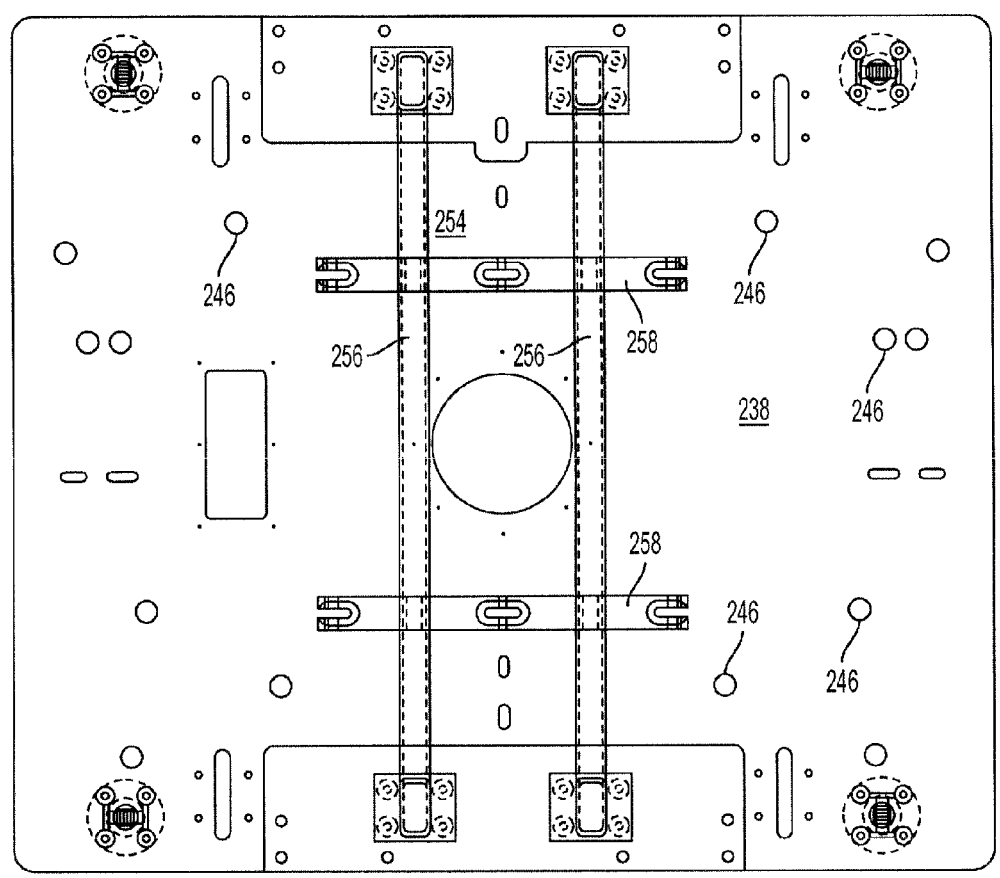
FIG. 27 is a plan view of the subassembly of the top plate and press suspension members that are shown in FIGS. 18-20.
Figure 28:
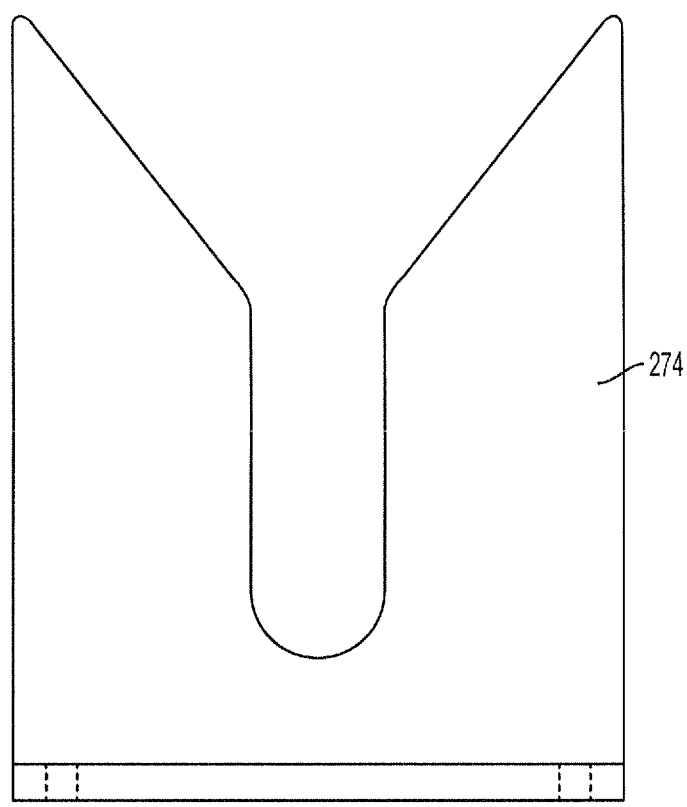
FIG. 28 is a part drawing of the guiding locator shown in FIGS. 18, 20, 23 and 24.
Figure 29:
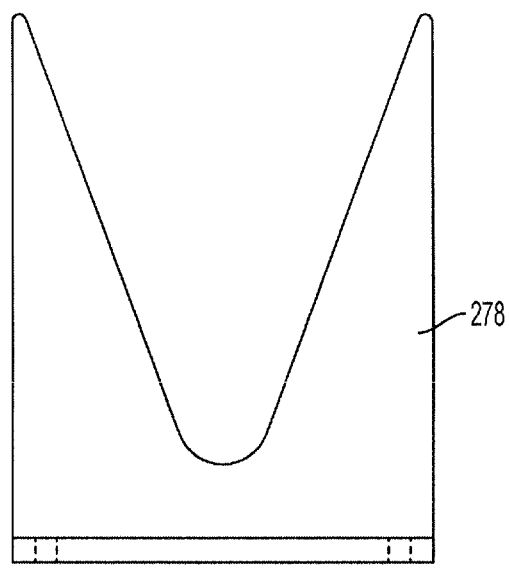
FIG. 29 is a part drawing of the resting locator shown in FIGS. 18, 20, 23 and 24.
Figure 30:
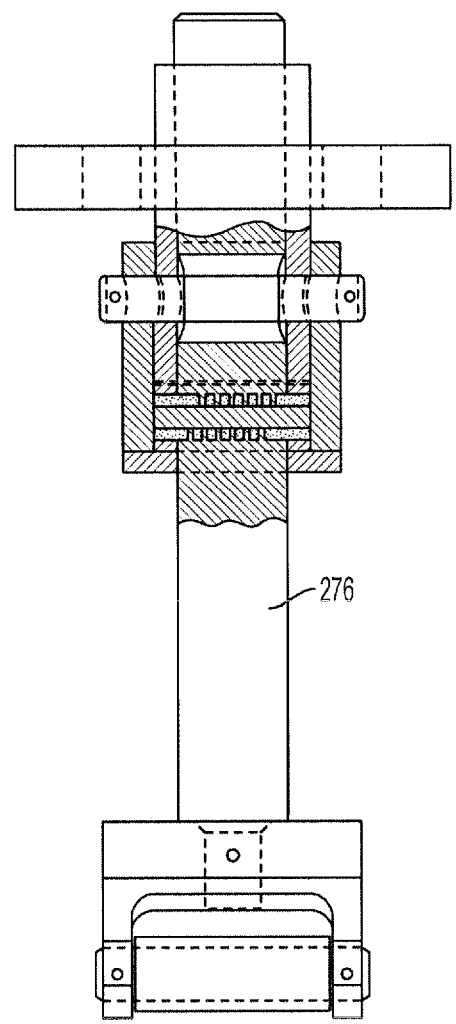
FIG. 30 is a subassembly drawing of the resting locator shown in FIGS. 18 and 20.
Figure 31:
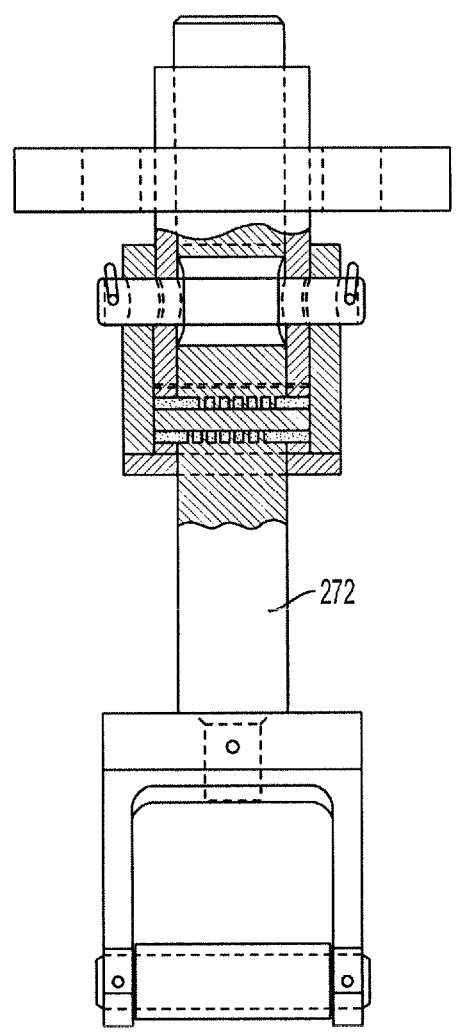
FIG. 31 is a subassembly drawing of the guiding locator shown in FIGS. 18 and 20.

FIGS. 18 through 31 show an embodiment of a two-stage gravity press in accordance with the disclosed invention. With particular reference to FIGS. 18-20, apparatus is disclosed for use in connection with a furnace, such as a lehr furnace, that has a shaping station at which transparencies are shaped according to a predetermined contour. The transparencies can be of the type that are made of laminated plies. Advantageously, the apparatus of FIGS. 18 through 31 can form two or more plies simultaneously to create plies that are paired at the time that the forming process is complete.

As shown in FIGS. 18-20, a frame 202 is constructed such that it is movable laterally through the furnace by placement on a furnace conveyor in the manner well known in the art. The frame is constructed so as to form a plurality of pedestals 204 that support respective frame stops 206. Frame 202 can further include thermal ballasts 208 that modify heat distribution within the plies. More particularly, thermal ballasts have a mass, shape and location on carrying frame 202 so as to modify the transfer of heat between carrying frame 202 and plies that are mounted thereon. In this way, thermal ballasts 208 influence the temperature of the plies to provide localized temperature variance in the plies according to a predetermined pattern that has been determined to influence transmittance or other selected properties of the plies.

As shown in FIG. 18, frame 202 supports a lower press ring 210 that is used to support the plies that are being shaped. Lower press ring 210 defines an upwardly facing clamping surface 212 for supporting the plies. The lower press ring only supports the transparency at the upwardly facing clamping surface 212. As the lower press ring passes through the furnace, the temperature of the plies increases causing the transparency to soften and sag in the middle of the lower press ring 210 inside of clamping surface 212. As described above, the thermal ballasts 208 that are included in the frame modify the transfer of heat to or from the transparency. The conveyor rate of travel and the heat profile within the furnace are controlled so that the plies are within a given temperature range at the time that they reach the forming station.

Referring to FIGS. 18-21, in the presently disclosed embodiment, the plies are formed by the lower press ring 210 in cooperation with a two-stage gravity press 214. The two-stage gravity press 214 includes a first stage gravity press ring that can be an upper press ring 216. Preferably, upper press ring 216 has a body 218 that defines a downwardly facing upper clamping surface 220 and a press contact surface 222 that is located on body 218 oppositely from the upper clamping surface 220. Upper press ring body 218 further defines a closed inner surface 224 that forms the inner side of the upper press ring 216. The upper clamping surface 220 opposes lower clamping surface 212 of the lower press ring at times when the carrying frame 202 is laterally positioned at the forming station of the lehr furnace.

Upper press ring 216 further includes a plurality of extensions 226 that protrude upwardly and oppositely away from upper clamping surface 220. Each of extensions 226 has a respective upper stop 228 that is located thereon between the distal end of the extension and body 218. Also, upper press ring includes a plurality of lower stops 230 that are located on body 218. Lower stops 230 are arranged on body 218 in a vertical position such that lower stops 230 are engageable with or vertically aligned to contact the frame stops 206 of frame 202 at times when the upper clamping surface 220 is located vertically above the upwardly facing clamping surface 212 by a predetermined clamping dimension 232. Also, lower stops 230 are arranged on body 218 in a vertical position such that lower stops 230 are engageable with or aligned to contact the frame stops 206 at times when the upper clamping surface 220 is located vertically apart from frame 202 by a predetermined vertical separation dimension.

The clamping dimension between clamping surface 220 and clamping surface 212 is determined according to the thickness of the plies such that at times when the lower stops 230 of the upper press ring 216 engage the frame stops 206, upwardly facing clamping surface 212 engages the bottom surface of the plies and the downwardly facing clamping surface 220 engages the upper surface of the plies at locations on the plies that are oppositely disposed such that the plies are clamped between clamping surfaces 212 and 220. Clamping surface 212 and clamping surface 220 are in the general shape of a ring so that the clamping surfaces clamp an area of the plies that defines a band that is located adjacent the peripheral edge of the plies.

The two-stage gravity press 214 further includes a second stage gravity press 234. In the preferred embodiment, second stage gravity press 234 includes the combination of an inner press 236 that is rigidly secured to a top plate 238 although second stage gravity press also can have other configurations that are consistent with the disclosed invention. As shown in the disclosed embodiment, second stage gravity press 234 is located at least partially inside closed inner surface 224 of upper press ring 216. The lower face of inner press 236 defines a forming surface that is located laterally inside the inner surface 224 of upper press ring 216. In the particular disclosed embodiment of second stage gravity press 234, inner press 236 is located at least partially inside closed inner surface 224 and defines a forming surface 240. In the disclosed embodiment of FIGS. 18-31, guides 241 are provided to direct the movement of inner press 236 within upper press ring 216. Guides can be of graphite or other lubricating material.

Inner press 236 is rigidly secured to top plate 238 by fasteners 248 that can be in the form of bolts 250 that pass through top plate 238 and are threaded into inner press 236. Top plate 238 and inner press 236 are maintained rigidly apart by cylindrical spacers 252 that correspond to respective bolts 250.

Top plate 238 which is included in second stage gravity press 234 defines an upper surface 242 and a lower surface 244 that is oppositely disposed on top plate 238 from upper surface 242. Top plate also defines a plurality of holes 246 between upper and lower surfaces 242 and 244 corresponding to respective extensions 226 of upper press ring 216. Extensions 226 pass through respective holes 246 and are freely moveable therein along the longitudinal dimension of extensions 226. Top plate 238 is located on extensions 226 between upper stop 228 and the body 218 of upper press ring so that the top plate is freely moveable between upper stops 228 and the body 218 of the upper press ring.

Second stage gravity press 234 is moveable with respect to said upper press ring 216 between a first position wherein the upper stops 228 of extensions 226 of upper press ring 216 are in contact with the upper surface 242 of top plate 234 and a second position wherein the lower surface 244 of top plate 238 is in contact with press contact surface 222 of upper press ring 216. At times when the lower stops 230 of upper press ring 216 are in contact with frame stops 206, plies that are supported on lower press ring 210 are clamped between clamping surface 212 of lower press ring 210 and clamping surface 220 of upper press ring as previously described. However, two-stage gravity press 214 is dimensioned such that the forming surface 240 does not contact the plies at times when the second stage gravity press 234 is in the first position.

When second stage gravity press 234 moves from the first position and reaches the second position, second stage gravity press 234 contacts the press contact surface 222 of upper press ring 216 as described previously. In the embodiment of FIGS. 18-31, second stage gravity press 234 is in the second position when lower surface 244 of top plate 238 contacts press contact surface 222 of upper press ring 216. As the second stage gravity press moves from the first position to the second position, the lower stops 230 of upper press ring 216 contact frame stops 206 of frame 202 and plies that are supported on lower press ring 210 are clamped between clamping surface 212 of lower press ring 210 and clamping surface 220 of upper press ring. As the second stage gravity press 234 proceeds further toward the second position, the forming face 240 of inner press 236 forms that portion of the plies that is inside the band of the plies that is clamped between upwardly facing clamping surface 212 and downwardly facing clamping surface 220 according to the forming surface 240 of inner press 236.

Movement of second stage gravity press 234 between the first position and the second position is controlled by the vertical movement of one end of a suspension assembly 254 (FIGS. 18 and 20) and by gravity forces on second stage gravity press 234. One end of suspension assembly 254 is selectively coupled to second stage gravity press 234. In the example of the embodiment shown in FIGS. 18-31, the end of suspension assembly 254 includes two beams 256 that are secured against the upper surface 242 of top plate 238, two cross-pieces 258, and a flexible tension member 260. Beams 256 define a space between the bottom surface 262 of beams 256 and the upper surface 242 of top plate 238. Arms or cross-pieces 258 extend transversely to the longitudinal axis of beams 256 and through the space between the bottom surface 262 of beams 256 and the upper surface 242 of top plate 238.

Flexible tension member 260, which can be made of chain, rope, chord, cable or other member with properties of high tensile strength and low longitudinal compressibility, is secured to arms or cross-pieces 258. At times when an end 264 of tension member 260 is at a vertical position so as to suspend arms 258, the arms move vertically in concert with vertical movement of the end 264 of the tension member. At a given vertical position of end 264 relative to second stage gravity press 234, arms 258 are in contact with the bottom surface 262 of beams 256. At times that end 264 is at positions that are vertically higher than the given position described above, arms 258 engage the bottom surface 262 of beams 256 so that the beams and second stage gravity press 234 move vertically up and down in correspondence with the vertical movement of the end of flexible tension member 260. At times when end 264 of flexible tension member is below the given vertical position described above, the action of suspension assembly 254 depends, in part, on the vertical position of second stage gravity press 234.

When second stage gravity press 234 is in the second position described previously herein, lower stops 230 are in contact with frame stops 206 and second stage gravity press is in contact with press contact surface 222. That is the lowest vertical position that second stage gravity press 234 can achieve. For vertical positions of suspension assembly 254 in which arms 258 are in contact with bottom surface 262 of beams 256 and second stage gravity press 234 moves from the second position in a direction toward the first position, vertically raising the end 264 of flexible tension member 260 will correspondingly raise second stage gravity press 234. However, at times when lower stops 230 are in contact with frame stops 206, vertically lowering the end 264 of flexible tension member 260 at a rate in excess of the vertical downward movements of second stage gravity press 234 due to gravitational forces on second stage gravity press 234 will cause the suspension assembly 254 to decouple from the second stage gravity press 234. Specifically, arms 258 will separate from the bottom surface 262 of beams 256 and second state gravity press 234 will move in the direction of the second position at a rate determined by gravitational forces on second stage gravity press 234.

When second stage gravity press 234 is in the first position described above, and the lower stops 230 are vertically above the frame stops 206, moving the end 264 of flexible tension member 260 further downwardly causes the second stage gravity press 234 to lower by a corresponding length until lower stop engage from stops 206 and forming surface 240 of inner press 236 engages the top surface of the plies. At the vertical position where forming surface 240 of second stage gravity press 234 engages the surface of the plies, the second stage gravity press 234 will continue to lower according to the slower of: (a) the rate at which the end 264 of flexible tension member continues to be lowered; or (b) the rate at which the forming surface 240 of inner press 234 proceeds in a downward vertical direction to shape the plies under force of gravity on second stage gravity press 234.

In accordance with the presently disclosed invention, it has been found that forming the plies by allowing the second stage gravity press 234 to progress vertically downwardly in the direction from the first position of second stage gravity press 234 to the second position (after the second stage gravity press encounters the plies) according to gravity force on second stage gravity press 234 results in improved forming of the plies. That is, the vertical downward movement of the second stage gravity press 234 in the direction from the first position to the second position under gravity influence and without additional mechanical downward force against the second stage gravity press to form the plies results in fewer folds, wrinkles and similar imperfections while producing greater fidelity to the intended design surface contour for the plies.

Accordingly, in the preferred embodiment, the end 264 of flexible tension member 260 is descended at a vertical rate that is higher than the rate at which the second stage gravity press 234 descends under the force of gravity. Such higher rate of descent of flexible tension member 260 causes suspension assembly 254 to decouple from second stage gravity press 234 by the separation of arms 258 away from the bottom surface 262 of beams 256.

It will be apparent to those skilled in the art that embodiments of suspension assembly 254 other than as strictly disclosed herein can accomplish the coupling and decoupling between suspension assembly 254 and second stage gravity press 234 such that the second stage gravity press proceeds vertically downwardly in the direction from the first position to the second position at the rate determined by gravitational force on the second stage gravity press. Such alternative structure is within the scope of the presently disclosed invention.

In the embodiment shown in FIGS. 18-31, suspension assembly 254 maintains first stage gravity press (i.e. upper press ring 216) and second stage gravity press 234 in vertical suspension as described above. Further structure of the embodiment to laterally position upper press ring 216 and second stage gravity press 234 with respect to lower press ring 210 is also disclosed. A lateral guide 266 for positioning upper press ring 216 and second stage gravity press 234 with respect to lower press 210 and frame 202 includes a first component 268 to laterally position top plate 238 (as part of second stage gravity press 234) with respect to frame 202 along a first axis (x). Lateral guide 266 further includes a second component 270 to laterally position top plate 238 with respect to frame 202 along a second axis (y) that is transverse to the first axis (x).

First component 268 includes a first part that is a guide locator 272 and a second part that is a guide receiver 274. In the embodiment of FIGS. 18-31, guide locator 272 is connected to top plate 238 and guide receiver 274 is connected to frame 202. Also, second component 270 includes a first part that is a resting locator 276 that is connected to top plate 238 and a resting receiver 278 that is connected to frame 202. Guide locators 272 are located on two corners of top plate 238 and resting locators 276 are located on the other two corners of top plate 238. Correspondingly, guide receivers 274 are located on two corners of frame 202 and resting receivers 278 are located on the other two corners of frame 202.

Generally, as the second stage gravity press 234 is lowered from a vertical position above frame 202 toward the frame, one of guide locators 272 engages the corresponding guide receiver 274 and one of resting locators 267 engages its corresponding resting receiver. The guide locator 272 and the resting locator 276 are located on two diagonally opposite corners of top plate 238 and the guide receiver 274 and resting receiver 278 are located on the corresponding diagonally opposite corners of frame 202 such that the second stage gravity press is guided to a lateral position with respect to frame 202 along the (x) axis. At the same time, the other of guide locators 272 engages its corresponding guide receiver 274 and the other of resting locator 276 engages their corresponding resting receiver 278. The other guide locator 272 and the other resting locator 276 are located on the other two diagonally opposite corners of top plate 238 and the other guide receiver 274 and other resting receiver 278 are located on the corresponding diagonally opposite corners of frame 202 such that the second stage gravity press is guided to a lateral position with respect to frame 202 along the (y) axis. Details of guide locators 272, guide receivers 274, resting locators 276, and resting receivers 278 are shown in FIGS. 28-31. It will be apparent to those skilled in the art that guide locators 272, guide receivers 274, resting locators 276, and resting receivers 278 of designs other than shown in FIGS. 28-31 also could be used in accordance with the presently disclosed invention. Further, it will also be apparent that the respective positions of the guide locators 272, guide receivers 274, resting locators 276, and resting receivers 278 could be variously changed also in accordance with the presently disclosed invention.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention.

What is claimed is:

1. For use in connection with a furnace and a shaping station to shape a transparency having at least one ply, the apparatus comprising:
   a. a frame that includes at least one frame stop said frame being laterally moveable through said furnace;
   b. a lower press ring that is supported on said frame and that defines an upwardly facing clamping surface for supporting at least one ply;
   c. a two-stage gravity press that is laterally positioned at said shaping station, said two-stage gravity press being vertically moveable with respect to said lower press ring at times when said lower press ring is located at said shaping station, said two-stage gravity press including:
      i. an upper press ring having a body that defines a closed inside surface, an upper contact surface, and a downwardly facing clamping surface, said upper press ring also having at least one stop and at least one extension with an upper stop on said extension, said upper press ring being vertically moveable to and from a clamping position at which said at least one stop of said upper press ring contacts said at least one frame stop at said clamping position where said upper press ring cooperates with said lower press ring to clamp said at least one ply between the upwardly facing clamping surface of the lower press ring and the downwardly facing clamping surface of said upper press ring, said upwardly facing clamping surface and said downwardly facing clamping surface clamping a band of said at least one ply that is adjacent the perimeter of said at least one ply; and
      ii. a second stage gravity press that is at least partially located laterally within the closed inside surface of said upper press ring, said second stage gravity press defining a downwardly facing press surface with a surface contour that corresponds to a selected finish contour of an area of said at least one ply, said second stage gravity press being moveable with respect to said upper press ring between a first position at which said second stage gravity press contacts the upper stop of said upper press ring and a second position at which said second stage gravity press contacts the upper contact surface of said upper press ring; and
   d. a suspension assembly that is selectively coupled to said second stage gravity press, said suspension assembly being vertically moveable to raise and lower said upper press ring at times when said at least one stop of said upper press ring is apart from said at least one frame stop, said suspension assembly also being vertically moveable to raise said second stage gravity press from said second position.

2. The apparatus of claim 1 wherein said second stage gravity press moves in the direction from said first position toward said second position in response to gravity force.

3. Apparatus for use in connection with a furnace that includes a conveyor and a shaping station for shaping at least one ply of a transparent glazing, said apparatus comprising:
  a. a frame that includes frame stops and that is moveable to the shaping station according to the travel of the conveyor;
  b. a lower press ring that is supported on said frame and that defines an upwardly facing clamping surface;
  c. a two-stage gravity press that is positioned at said shaping station and that is vertically moveable with respect to said lower press ring, said two-stage gravity press including:
    i. a first stage gravity press ring that defines an upper contact surface and that includes at least one upper stop and at least one lower stop, said first stage gravity press ring also defining a closed inner side and a downwardly facing clamping surface that opposes the upwardly facing clamping surface of said lower press ring, said first stage gravity press ring being vertically moveable with respect to said lower press ring to clamp a band of said at least one ply that is adjacent the perimeter of said at least one ply between the upwardly facing clamping surface of the lower press ring and the downwardly facing clamping surface of the first stage gravity press ring at times when said at least one lower stop of said first stage gravity press ring contacts said frame stops; and
    ii. a second stage gravity press that is at least partly located laterally within the first stage gravity press ring, said second stage gravity press defining a downwardly facing surface that defines a selected finish contour corresponding to an area of said at least one ply that is located laterally inside the band of said at least one ply that is clamped between the clamping surface of the lower press ring and the clamping surface of the first stage gravity press ring, said second stage gravity press being vertically moveable with respect to said first stage gravity press ring between a first position at which said second stage gravity press contacts said at least one upper stop of said first stage gravity press ring and a second position at which said second stage gravity press engages the contact surface of said first stage gravity press ring; and
  d. a suspension assembly having an end that is coupled to said second stage gravity press, said suspension assembly being vertically moveable to control the vertical position of said first stage gravity press ring at times when the at least one lower stop of said first stage gravity press ring is positioned apart from said frame stops, and to control the vertical position of said second stage gravity press with respect to said first stage gravity press ring at times when the at least one lower stop of said first stage gravity press ring contacts said frame stops and said second stage gravity press is moved vertically in a direction from said second position to said first position.

4. The apparatus of claim 3 wherein said at least one ply is formed when said second stage gravity press moves from said first position to said second position.

5. The apparatus of claim 3 wherein said suspension assembly is coupled to said second stage gravity press to hold said first stage gravity press ring and said second stage gravity press in suspension at times when the at least one lower stop of said first stage gravity press ring is located apart from said frame stops.

6. The apparatus of claim 5 wherein said suspension assembly includes a member selected from the group comprised of rope, chain, chord and cable.

7. Apparatus for shaping at least one ply at a forming station that is used in connection with a furnace, said apparatus comprising:
  a. a carrying frame that has at least one frame stop, said carrying frame being moveable to and from the forming station;
  b. a lower press ring that is secured to said carrying frame, said lower press ring defining a lower clamping face;
  c. an upper press ring that includes at least one upper stop and at least one lower stop, said upper press ring also having a body that defines a press contact surface, an inner side and an upper clamping face that opposes the lower clamping face of said lower press ring at times when said carrying frame is located at said forming station;
  d. a second stage gravity press that defines a forming surface that is located laterally inside the inner side of said upper press ring, said second stage gravity press being vertically moveable with respect to said upper press ring between a first position wherein said second stage gravity press is in contact with the at least one upper stop of said upper press ring and a second position wherein the second stage gravity press is in contact with the press contact surface of said upper press ring; and
  e. a suspension member that is selectively coupled to said second stage gravity press such that said suspension member vertically suspends said second stage gravity press and said upper press ring at times when said at least one lower stop of said upper press ring are vertically apart from said at least one frame stop of said carrying frame, and such that said suspension member decouples from said second stage gravity press at times when said at least one lower stop of said upper press ring are in contact with said at least one frame stop of said carrying frame and the second stage gravity press moves in the vertical direction from said first position to said second position such that said second stage gravity press shapes said at least one ply in response to gravity forces on said second stage gravity press.

8. The apparatus of claim 7 including a lateral guide that has first and second parts, said carrying frame including the first part of said lateral guide and said second stage gravity press including the second part of said lateral guide, said first and second parts of said lateral guide cooperating to laterally align the upper clamping face of said upper press ring with the lower clamping face of said lower press ring at times when the lower stop of said upper press ring contacts said at least one frame stop of said carrying frame.

9. The apparatus of claim 8 wherein said first and second parts of said lateral guide comprise a first component that guides the lateral position of said upper press ring with respect to a first lateral axis.

10. The apparatus of claim 9 wherein said first and second parts of said lateral guide further comprise a second component that guides the lateral position of said upper press ring with respect to a second lateral axis that is transverse to said first lateral axis.

11. The apparatus of claim 10 wherein the first part of said lateral guide is one of a resting locator and a resting receiver and the second part of said lateral guide is the other of said resting locator and said resting receiver, said resting receiver cooperating with said resting locator to receive a portion of said resting locator therein.

12. The apparatus of claim 11 wherein the first part of said lateral guide is a resting locator and the second part of said lateral guide is a resting receiver.

13. The apparatus of claim 9 wherein the first part of said lateral guide is one of a guide locator and a guide receiver and the second part of said lateral guide is the other of said guide locator and said guide receiver, said guide receiver cooperating with said guide locator to receive a portion of said guide locator therein.

14. The apparatus of claim 13 wherein the first part of said lateral guide is a guide locator and the second part of said lateral guide is a guide receiver.

15. The apparatus of claim 8 wherein the first and second parts of said lateral guide include vertical adjustments.

16. The apparatus of claim 7 wherein said at least one upper stop of said upper press ring is located on extensions from the body of said upper press ring, said extensions protruding from said body in a direction oppositely from said upper clamping face, and wherein said second stage gravity press comprises:
   a. an inner press that defines a perimeter side that at least partially opposes the inner side of said upper press ring, said inner press also defining said forming surface within the boundary of said perimeter side; and
   b. a top plate that is rigidly secured to said inner press, said top plate having apertures with each of said apertures maintaining a respective extension of said upper press ring such that the extensions of said upper press ring are vertically moveable within said apertures.

17. The apparatus of claim 16 wherein said top plate has a body that defines a first side and a second side that is located oppositely on the body of said top plate from said first side, and wherein the at least one upper stop of said upper press ring is mounted on a respective extension of said upper press ring, the extensions of said upper press ring being moveable within a respective aperture of said top plate between a position wherein the first side of said top plate is in contact with said at least one upper stop of said upper press ring, and a position wherein the second side of said top plate is in contact with the press contact surface of the body of said upper press ring.

18. The apparatus of claim 17 wherein the vertical positions of said at least one upper stop on said extensions are adjustable with respect to the body of said upper press ring.

19. The apparatus of claim 16 wherein at least one of said upper press ring and said second stage gravity press includes at least one press guide to direct the movement of said second stage gravity press between said first position and said second position.

20. The apparatus of claim 19 wherein said at least one press guide is located on at least one of the inner side of upper press ring and the perimeter side of said inner press.

21. The apparatus of claim 16 wherein said suspension member comprises:
   a. At least one beam that is secured to said top plate, said at least one beam defining a space between said at least one beam and said top plate;
   b. At least one cross-piece that extends transversely to said at least one beam and through the space between said at least one beam and said top plate; and
   c. A flexible tension member having an end that is vertically moveable, said vertically moveable end being secured to said at least one cross-piece, the end of said flexible tension member being moveable vertically upwardly at times when said second stage gravity press is in said second position to cause said cross-piece to engage said at least one beam and move said second stage gravity press in an upward direction toward said first position.

22. The apparatus of claim 21 wherein the end of said flexible tension member is vertically moveable in a downward direction at times when said second stage gravity press moves in a direction from said first position toward said second position to release said second stage gravity press from said suspension member by causing said at least one cross-piece to separate from said at least one beam.

23. The apparatus of claim 16 wherein said second stage gravity press is secured to said top plate by threaded connectors that are located inside a cylindrical spacer.

24. The apparatus of claim 7 wherein said carrying frame further comprises at least one thermal ballast.

25. The apparatus of claim 7 wherein said carrying frame further comprises at least one thermal ballast that modifies that transfer of heat between said carrying frame and said at least one ply.

26. The apparatus of claim 7 wherein the forming surface of said second stage gravity press include a plurality of openings, said apparatus further comprising a fluid network that defines an input opening and a plurality of fluid passageways between the input opening and the plurality of openings in the forming surface of said second stage gravity press, said fluid network being responsive to fluid pressure at said input opening at times when said second stage gravity press moves from said second position in a direction toward said first position to cause said at least one ply to separate from the forming surface of said second stage gravity press.

27. The apparatus of claim 7 wherein the at least one upper stop of said upper press ring includes vertical adjustments.

28. Apparatus for forming at least one ply, said apparatus comprising:
   a.) a carrying frame that includes at least one frame stop and that also includes at least one locator that has first and second parts;
   b.) a lower press ring that is secured to said carrying frame, said lower press ring defining an upper surface for supporting at least one ply;
   c.) a top plate, the second part of said at least one locator being connected to said top plate, said second part cooperating with the first part of at least one locator to laterally position said top plate with respect to said carrying frame;
   d.) an upper press ring that is vertically moveable with respect to said carrying frame, said upper press ring defining an inner side and a clamping face, said upper press ring also including at least one stop that engages at least one frame stop of said carrying frame to define a lower limit position for the vertical movement of said upper press ring with respect to said carrying frame;
   e.) an inner press that is rigidly connected to said top plate and that is located laterally inside the inner side of said upper press ring, said inner press defining a forming face and being vertically moveable with respect to said upper press ring; and
   f.) a suspension member that is vertically moveable, said suspension member being coupled to said top plate such that, at times when said at least one stop of said upper press ring engages said at least one frame stop of said carrying frame, said inner press moving vertically upward with respect to said upper press ring in response to the vertical upward movement of said suspension member.

29. The Apparatus of claim 28 wherein said apparatus includes at least one press guide for directing the movement of said inner press with respect to said upper press ring.

30. The Apparatus of claim 28 wherein one of said first and second parts of said locator comprises a receiving member and the other of said first and second parts of said locator comprises a guiding member such that one of said receiving member and said guiding member is secured to said carrying frame and the other of said receiving member and said guiding member is secured to said top plate.

31. The Apparatus of claim 28 wherein said upper press ring has an upper stop and a lower stop, said suspension member being coupled to said top plate such that said suspension member suspends said top plate and said upper press ring at times when the at least one stop of said upper press ring is apart from the at least one frame stop of said carrying frame and wherein said suspension member decouples from said top plate at times when said lower stop of said upper press ring is in contact with said at least one frame stop and said inner press moves in a vertical direction from a first position where the top plate contacts the upper stop of said upper press ring toward a second position where the inner press contacts the upper press ring such that said top plate and said upper press ring are not suspended by the suspension member.

32. The Apparatus of claim 28 further comprising a plurality of fluid passageways between at least one input port and a plurality of openings in the forming face of said inner press, such that positive fluid pressure at said at least one input port is transferred to said plurality of openings to urge said at least one ply away from the forming face of said inner press.

33. The Apparatus of claim 28 wherein said suspension member includes at least one bridge that cooperates with said top plate to define an opening therebetween, and wherein said suspension member includes at least one arm that extends freely through said opening, said at least one arm contacting said at least one bridge at times when said suspension member suspends at least said inner press.

34. The Apparatus of claim 33 wherein said at least one arm is separated from said at least one bridge at times when said inner press is gravity forced against said at least one ply.

* * * * *